United States Patent
Tan et al.

(10) Patent No.: US 7,170,574 B2
(45) Date of Patent: Jan. 30, 2007

(54) TRIM RETARDERS INCORPORATING NEGATIVE BIREFRINGENCE

(75) Inventors: Kim Leong Tan, Santa Rosa, CA (US); Karen Denise Hendrix, Santa Rosa, CA (US); Markus Duelli, Santa Rosa, CA (US); Charles Andy Hulse, Sebastopol, CA (US)

(73) Assignee: JDS Uniphase Corporation, Milpitas, CA (US)

( * ) Notice: Subject to any disclaimer, the term of this patent is extended or adjusted under 35 U.S.C. 154(b) by 176 days.

(21) Appl. No.: 11/009,476

(22) Filed: Dec. 10, 2004

(65) Prior Publication Data

US 2005/0128391 A1   Jun. 16, 2005

Related U.S. Application Data

(60) Provisional application No. 60/589,167, filed on Jul. 19, 2004, provisional application No. 60/587,924, filed on Jul. 14, 2004, provisional application No. 60/586,542, filed on Jul. 9, 2004, provisional application No. 60/529,315, filed on Dec. 11, 2003.

(51) Int. Cl.
*G02F 1/1335* (2006.01)
(52) U.S. Cl. .................... 349/117; 349/119
(58) Field of Classification Search ............. 349/117, 349/119, 96
See application file for complete search history.

(56) References Cited

U.S. PATENT DOCUMENTS

| | | | |
|---|---|---|---|
| 2,478,385 A | 8/1949 | Gaiser | |
| 3,185,020 A | 5/1965 | Thelen | |
| 3,463,574 A | 8/1969 | Bastien et al. | |
| 3,565,509 A | 2/1971 | Sulzbach | |
| 3,604,784 A | 9/1971 | Louderback et al. | 350/164 |
| 3,781,090 A | 12/1973 | Sumita | 350/164 |
| 3,799,653 A | 3/1974 | Ikeda | 350/164 |
| 3,822,926 A | 7/1974 | Fr et al. | |
| 3,936,136 A | 2/1976 | Ikeda et al. | 350/1 |
| 4,313,647 A | 2/1982 | Takazawa | 350/164 |
| 4,666,250 A | 5/1987 | Southwell | 350/166 |
| 5,142,393 A * | 8/1992 | Okumura et al. | 349/121 |
| 5,184,237 A * | 2/1993 | Iimura et al. | 349/119 |
| 5,196,953 A * | 3/1993 | Yeh et al. | 349/119 |
| 5,220,447 A * | 6/1993 | Yokokura et al. | 349/119 |
| 5,688,566 A * | 11/1997 | Broer et al. | 428/1.31 |
| 5,798,808 A * | 8/1998 | Van Haaren et al. | 349/96 |
| 6,912,030 B1* | 6/2005 | Coates et al. | 349/119 |
| 2002/0047968 A1 | 4/2002 | Keisnke et al. | |
| 2003/0128320 A1 | 7/2003 | Xiang-Dong et al. | |

OTHER PUBLICATIONS

H. Seiberle, K. Schmitt and M. Schadt, "Multidomain LCDs and Complex Optical Retarders Generated by Photo-alignment," Proc. Eurodisplays '99, pp. 6-9, Sep. 1999.
"Birefringent Compensators for Normally White TN-LCD's", Eblen J.P, et al, Society for Information Display, SID International Papers, San Jose, Jun. 14-16, 1994; Santa Ana SID, U.S. vol. 25, Jun. 14, 1994, pp. 245-248, XP000462707, Chapter, Design.

* cited by examiner

*Primary Examiner*—David Nelms
*Assistant Examiner*—David Chung
(74) *Attorney, Agent, or Firm*—Allen, Dyer, Doppelt, Milbrath & Gilchrist, P.A.

(57) ABSTRACT

The present invention relates to trim retarders used to compensate for residual birefringence created by liquid crystal display panels. In particular the present invention relates to a trim retarder with negative out-of-plane birefringence provided by a form birefringent multi-layer dielectric stack for compensating for retardances resulting from liquid crystal on silicon display panels.

20 Claims, 24 Drawing Sheets

Figure 7
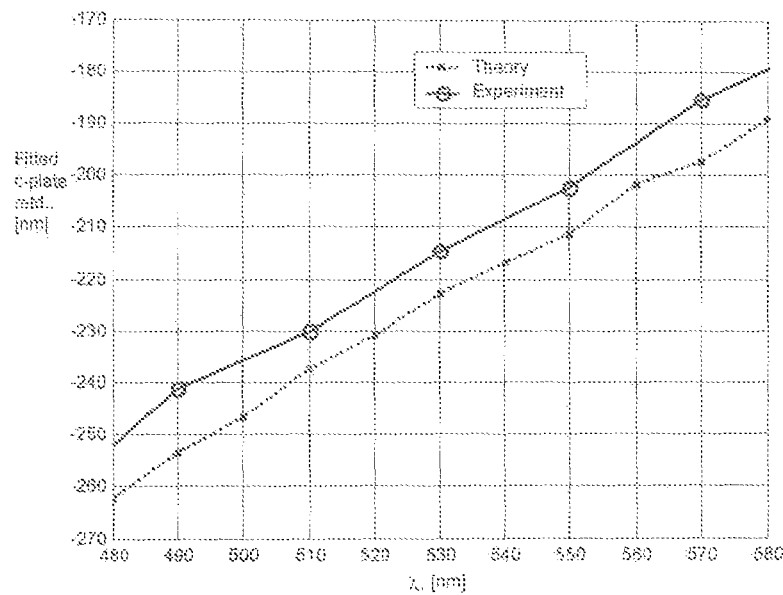
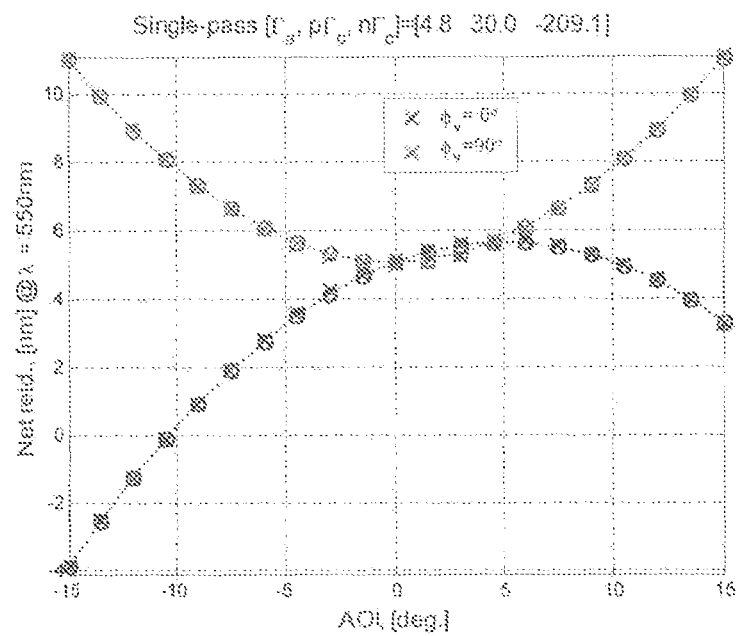
Figure 8

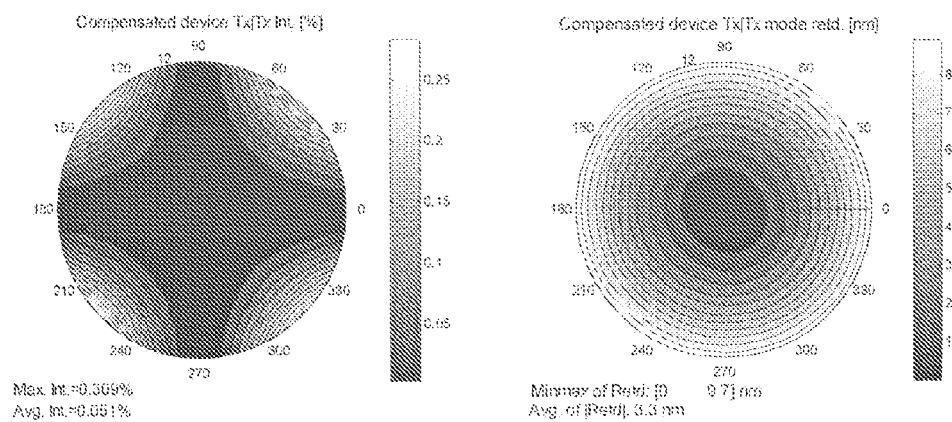
Figure 15a
Figure 15b
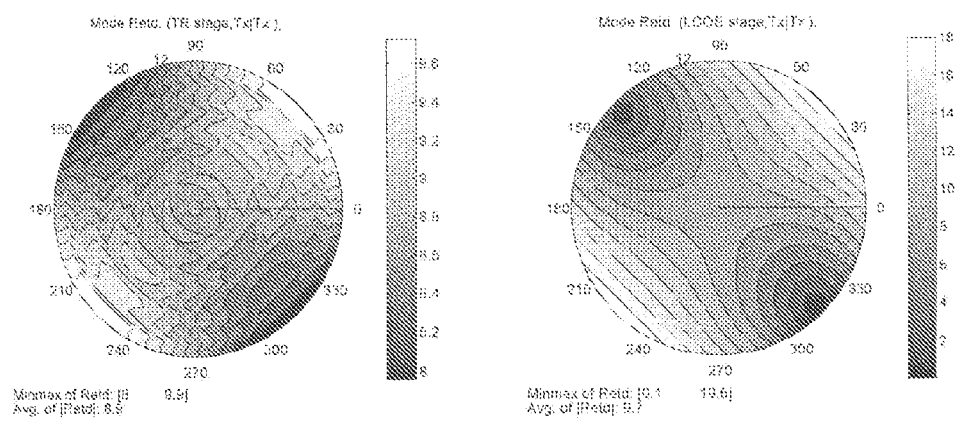
Figure 15c
Figure 15d

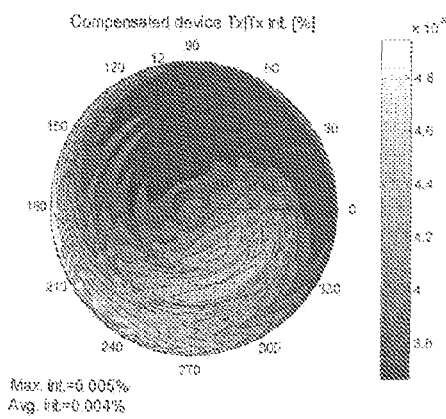 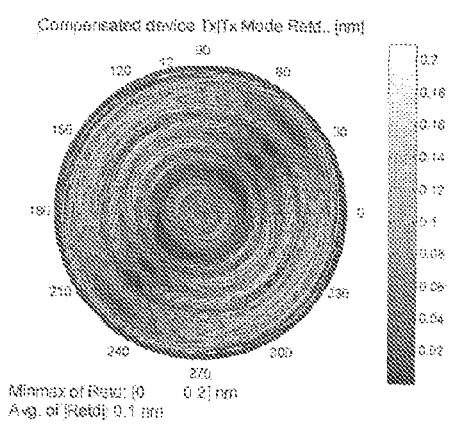
Figure 18a    Figure 18b
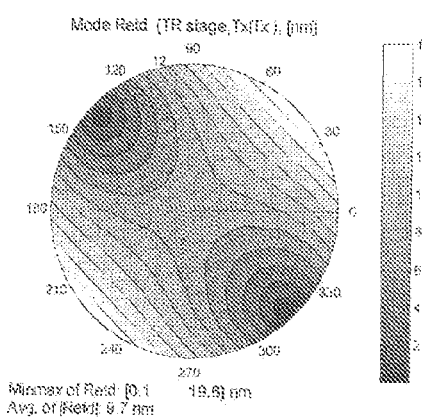 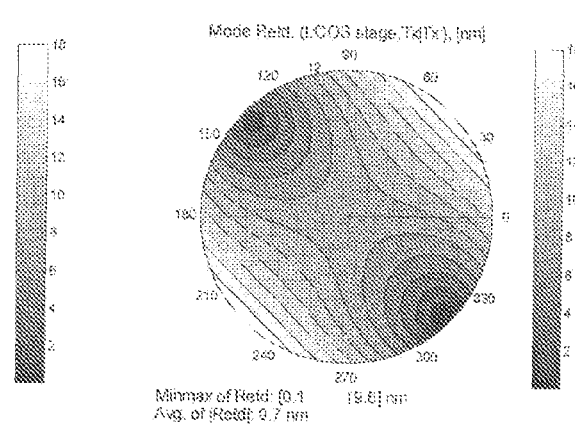
Figure 18c    Figure 18d Figure 33
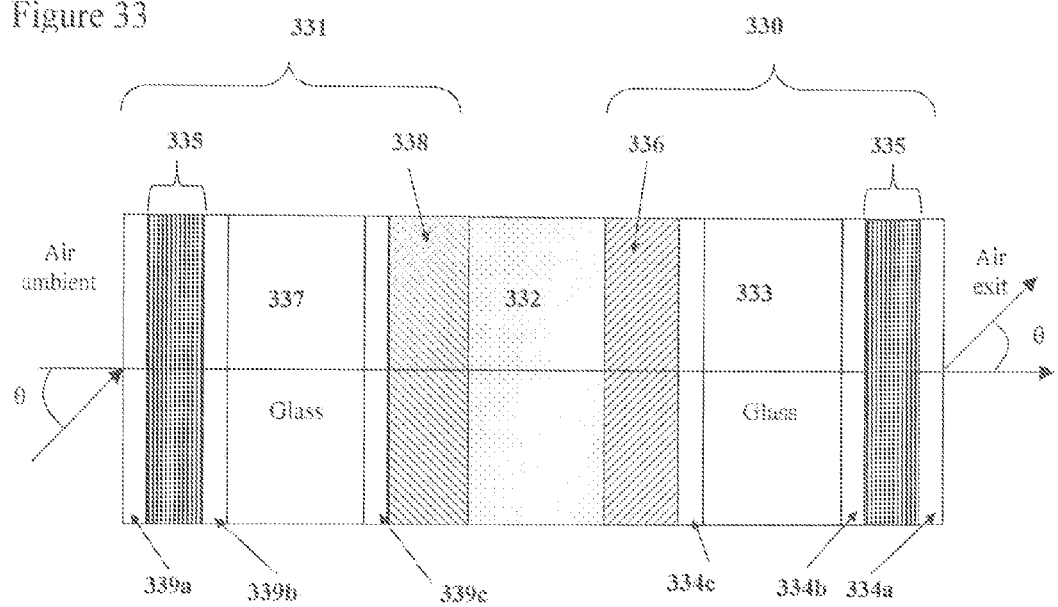
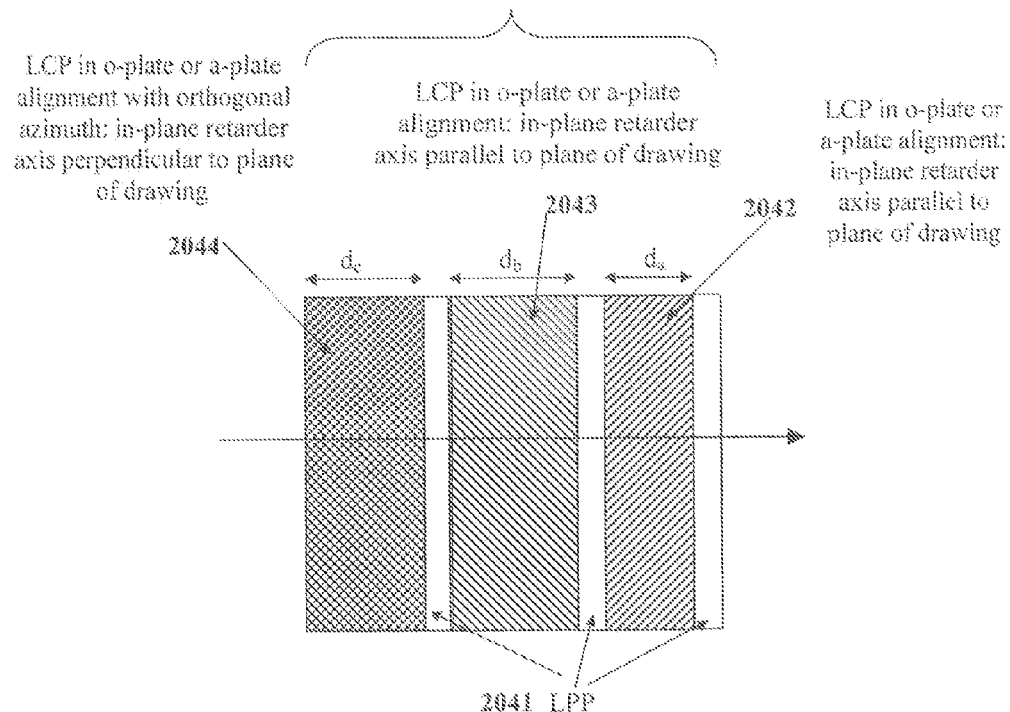
Figure 34

TRIM RETARDERS INCORPORATING NEGATIVE BIREFRINGENCE

CROSS-REFERENCE TO RELATED APPLICATIONS

The present invention claims priority from U.S. Patent Applications Nos. 60/529,315 filed Dec. 11, 2003; 60/587,924 filed Jul. 14, 2004; 60/589,167 filed Jul. 19, 2004, and 60/586,542 filed Jul. 9, 2004, which are incorporated herein by reference.

TECHNICAL FIELD

The present invention relates to an optical compensator for polarization based micro-display imagers, e.g. a reflective Liquid-Crystal-on-Silicon (LCOS) or a Transmissive Liquid Crystal Display (xLCD) panel, and in particular to a trim retarder with negative birefringence.

BACKGROUND OF THE INVENTION

A trim retarder compensates for residual retardation of the micro-display imager panel in a dark (OFF) state. Unlike typical birefringent waveplates providing ¼λ or ½λ retardation, a typical A-plate trim retarder provides between 1 nm and 50 nm of in-plane retardation. The primary benefit of introducing a trim retarder into a display system is to enhance image contrast, while not significantly degrading the ON-state brightness. In conventional LCOS and xLCD display systems, illustrated in FIGS. 1a and 1b, respectively, one or more trim retarders 2 are positioned adjacent to imager panels 3, typically less than an inch diagonal, for receiving a cone of light 4, typically with a cone illumination of ±12°, from a polarization beam splitter 5.

Conventional thermotropic liquid crystals in reflective LCOS imager panels are either twisted nematic, e.g. 45° twist (45TN), or vertically-aligned nematic (VAN-mode), which get switched (or relaxed) to near homeotropic orientation. Other LC-modes in reflective LCOS and transmissive xLCD, i.e. bend-aligned nematic or pi-cell, also require trim retarders, if the LC-technology employs a dark-state director orientation near the homeotropic alignment. A VAN-mode cell on a reflective substrate is functionally equivalent to a pi-cell in transmission mode, i.e. both operate as electrically controllable birefringence for gray-scale with viewing angle symmetry about an axis orthogonal to the LC tilt-plane.

In homeotropic alignment the LC uniaxial positive molecules are oriented normal to the device plane. The dark-state may be a switched state or a relaxed state, depending on LC modes. In most applications, a true homeotropic orientation in the dark state is not suitable, i.e. a pre-tilt is required to provide consistent and faster switching behavior. Moreover, true homeotropic orientation in the dark state may not be available due to a lack of high voltage supplies in 45TN panels, or due to boundary LC layers being anchored by alignment surface effects. As a consequence, the display panels exhibit both an in-plane and an out-of-plane residual retardation component, i.e. A-plate and C-plate components, respectively. Due to the use of positive-only uniaxial LC in LCD panels, the c-plate component is always positive, thereby adding to the net panel retardance at off-axis illumination.

In typical polarization-based light engine architectures, the imager panel illumination lens has a reasonably small focal ratio (f/#), i.e. focal length/iris diameter, in order to provide for adequate light throughput. A typical f/# is 2.5 for an inch diagonal imager panel size and approximately ±12° cone angles in air. Accounting for the imager panel and the light engine characteristics, the residual retardation compensation can be broadly divided into two steps: first the in-plane retardation (IPR) component of the imager panel is negated by aligning an A-plate component with the optic axes of the imager panel (also c-axes) at 90° relative azimuth, and then improving the field of view by removing the imager out-of-plane retardance (OPR) with a negative c-plate (NCP) retarder component. Note that the optic axes may deviate slightly from the nominal crossed orientations due to the mismatch in the IPR of imager panel and the trim retarder.

IPR compensation is almost always the primary step due to the lack of true homeotropic LC orientation. There is quite a mismatch between the relative contribution of the imager IPR and OPR to the overall net retardation under a cone illumination. As an example, the VAN-mode panel is aligned with an 80° to 89° oblique-tilt (typically 80° to 83°). The effective e-wave indices of refraction parallel and orthogonal to the device plane are given by the following expressions obtained from uniaxial index ellipsoid formula:

$$\frac{1}{n_e^2(\theta_c; \text{in-plane})} = \frac{\sin^2(\theta_c)}{n_e^2} + \frac{\cos^2(\theta_c)}{n_o^2}, \text{ and} \quad (1)$$

$$\frac{1}{n_e^2(\theta_c; \text{out-plane})} = \frac{\sin^2(\theta_c)}{n_o^2} + \frac{\cos^2(\theta_c)}{n_e^2}, \quad (2)$$

where $n_e$ and $n_o$ are intrinsic material extraordinary and ordinary indices of refraction at a given wavelength, and $\theta_c$ is the c-axis tilt from the device normal direction. The decomposition of an o-plate, i.e. VAN-mode, positive uniaxial retardation into two orthogonal components is illustrated in FIG. 2. Taking example LC parameters of Δn=0.15 ($n_e$=1.65 and $n_o$=1.50) and IPR of 5 nm single pass, OPR values are 180 nm and 380 nm single pass @ $\theta_c$=80° and 83°, respectively, which are within the range of commercially available VAN-mode panels. For a reflective LCOS imager panel, the overall imager OPR has to include the undesirable off-axis birefringence effects of metallic reflectors at the silicon backplane. For other important LC-modes, namely the 45TN-mode, the range of IPR typically falls within 15 nm to 25 nm, and the associated OPR has about 200 nm within the visible wavelength spectrum. For any imager panel with both IPR and OPR, one could assign the ratio of OPR to IPR as $$\gamma = \Gamma_c/\Gamma_a$$

$\gamma_{(VAN)}$=36× to 76× or more depending on pre-tilt, and $\gamma_{(45TN)}$=8× to 13×.

With reference to FIG. 3, which illustrates a conventional two-layer A/C-plate retarder model, the IPR component falls off as a function of $\cos(\theta_o)$, and the OPR component increases as a function of $\sin^2(\theta_o)\cos(\theta_o)$, where $\theta_o$ is the refractive angle for the o-ray in the birefringent medium. These approximations are valid for a limited cone angle, e.g. up to ±30° in air. For a limited cone angle of ±12°, the roll-off effect on IPR is negligible; however, the net retardation contribution from the OPR is approximately, $\Gamma_c'=\Gamma_c(\text{intrinsic})\times\eta$, where $\eta$ varies from 0 to 1.9% for AOI=0° to 12°.

Assuming the average net retardance contributions from the OPR over 0° to 12° is 1%, then from the average multiples (γ) of intrinsic OPR to IPR values, the contributions of OPR to the effective retardations are given by, $\Gamma_c'=\eta\gamma\Gamma_a\approx\frac{1}{100}*50*\Gamma_a$, or $0.5\Gamma_a$ for VAN-mode and $\Gamma_c'=\eta\gamma\Gamma_a\approx\frac{1}{100}*10*\Gamma_a$, $0.1\Gamma_a$ for 45TN-mode.

The effect of OPR at angles of incidence of less than 12° is only a fraction of the corresponding IPR retardation. These typical retardation components for VAN and 45TN-mode illustrate the critical need to first compensate for the IPR, and then improve the field of view properties of the display. It also suggests that it is paramount to compensate for the OPR in a VAN-mode panel, whereas a 45TN-mode panel has much less to gain from NCP compensation.

An in-plane retardation component can be fabricated using the LCP/LPP technology, configured as an A-plate (planar LC director alignment) or an O-plate (oblique LC director alignment), as disclosed in copending patent application 60/529,315 filed Dec. 11, 2003; 60/587,924 filed Jul. 14, 2004; and 60/589,167 filed Jul. 19, 2004, which are incorporated herein by reference.

In order to introduce a negative C-plate component, with the c-axis of the LC medium perpendicular to the device plane, an averaging effect of tight-pitch cholesteric LC has been proposed. For the cholesteric negative c-plate to work, the helical pitch LC medium must be shorter than the shortest wavelength in the visible wavelength range, i.e. a pitch value of 250 nm. Unfortunately, the use of cholesterics with in-plane LC director alignment may present unwanted crossed polarization leakage into an LCOS projection system, due to the high intrinsic material birefringence involved.

Alternatively, in the area of crystal waveplates, a pseudo-zero order waveplate retarder can be fabricated by crossing optic axes of two birefringent plates. The individual layers may be positive, e.g. single-crystal quartz, or negative, e.g. Calcite, birefringence. This arrangement can also used for fabricating achromatic waveplates utilizing two waveplate elements with appropriate dispersion profiles, i.e. single-crystal quartz and magnesium fluoride combinations.

U.S. Pat. No. 5,196,953 issued to Yeh et al on Mar. 23, 1993 discloses a transmissive LCD device incorporating dielectric form birefringence compensator in which the LCD is compensated by creating the conditions:

$|\Delta n_L|d_L=|\Delta n_C|d_c$, wherein Δn is the birefringence, d is the layer thickness, and subscripts '$L$' and '$C$' refer to the switchable LC-layer and the dielectric form birefringence compensator, respectively. In a preferred embodiment the lower and higher index values of $n_o$ and $n_e$ in the LC layer and the compensator sections are matched. Unfortunately, this approach greatly restricts the type of dielectric form birefringence compensator material for use therein, and requires accurate measurement of material constants and coating thicknesses. Moreover, this method does not take into account the retardance caused by an off-axis reflection from the air/substrate interface. Furthermore, limiting the $n_o$ and $n_e$ to those of the LC-layer would necessitate very thick coating layers for large −C values.

Conventional antireflection coating designs, such as those disclosed in U.S. Pat. No. 2,478,385 issued Aug. 9, 1949 in the name of Gaiser, U.S. Pat. No. 3,185,020 issue May 25, 1965 in the name of Thelen, and U.S. Pat. No. 3,604,784 issued Sep. 14, 1971 in the name of Louderback et al, are comprised of three layers, which cause destructive interference between reflected and refracted light within a given wavelength band defined by a center wavelength. The first layer has an optical thickness of a quarter wavelength of the center wavelength and a low refractive index, the second layer has an optical thickness of a half wavelength of the center wavelength and a high refractive index, and a third layer has an optical thickness of a quarter wavelength of the center wavelength and a medium refractive index, together forming a QHQ AR structure.

Further advancements in antireflection coatings, which are disclosed in U.S. Pat. No. 3,463,574 issued Aug. 26, 1969 to Bastien et al, U.S. Pat. No. 3,565,509 issued Feb. 23, 1971 to Sulzbach, U.S. Pat. No. 3,781,090 issued Dec. 25, 1973 to Sumita, U.S. Pat. No. 3,799,653 issued Mar. 26, 1974 to Ikeda, U.S. Pat. No. 3,936,136 issued Feb. 3, 1976 to Ikeda et al, U.S. Pat. No. 4,313,647 issued Feb. 2, 1982 to Takazawa, and U.S. Pat. No. 4,666,250 issued May 19, 1987 to Southwell et al relate to multi-layer antireflection coatings and the use of Herpin equivalents to design multi-layer structures with the desired index of refraction.

An object of the present invention is to overcome the shortcomings of the prior art by providing a predictable and environmentally stable optical trim retarder for both in-plane and out-of-plane residual retardation components in transmissive, e.g. xLCD, and reflective, e.g. LCoS, image panels.

SUMMARY OF THE INVENTION

Accordingly, the present invention relates to a polarization controlling device for providing a desired amount of phase delay to compensate for a predetermined amount of out of plane retardance between 10 nm and 1000 nm in a liquid crystal (LC) display panel, which has out of plane ordinary and extraordinary indices of refraction, comprising:

a substrate having a refractive index;

a form birefringent multi-layer dielectric (FB) stack disposed on the substrate including a first plurality of layers having a first refractive index and a first optical thickness; and a second plurality of layers having a second refractive index and a second optical thickness, interleaved with the first plurality of layers, defining effective out of plane ordinary and extraordinary indices of refraction; and first and second anti-reflection (AR) coatings at interfaces between ambient atmosphere and the device for decreasing the amount of reflection therefrom;

wherein the first and second optical thicknesses are between $\frac{1}{120}$ and $\frac{1}{16}$ of the center wavelength resulting in a one-dimensional grating structure forming a −C plate for compensating out of plane retardances from the LC panel and from the AR coatings; and wherein a difference between the first and second indices of refraction is greater than 0.5 for increasing the effective indices of refraction and decreasing the width of the FB stack required.

BRIEF DESCRIPTION OF THE DRAWINGS

The invention will be described in greater detail with reference to the accompanying drawings which represent preferred embodiments thereof, wherein:

FIG. 7 is a plot of a single pass NCP retardation dispersion profile, as reference to a standard negative uniaxial medium;

FIG. 8 is a plot of a net retardation profile vs angle of incidence in air;

FIG. 15a is a conoscopic crossed polarization leakage profile of an LCOS device compensated with a trim retarder without an NCP element;

FIG. 15b is a conoscopic residual retardance profile of an LCOS device compensated with a trim retarder without an NCP element;

FIG. 15c is a conoscopic mode retardance profile of an A-plate trim retarder with its slow axis aligned at 135°;

FIG. 15d is a conoscopic mode retardance profile of an O-plate LCOS device with its slow axis aligned at 45°;

FIG. 18a is a conoscopic leakage profile of a compensated device according to the present invention;

FIG. 18b is a conoscopic residual retardance profile of a compensated device according to the present invention;

FIG. 18c is a conoscopic mode retardance profile of a trim retarder according to the present invention;

FIG. 18d is a conoscopic mode retardance profile of an LCoS panel;

FIG. 33 is a side view of an alternative embodiment of the present invention including two FBAR stacks and two a-plates on separate substrates laminated together;

FIG. 34 is a side view of a three layered polymeric retarder having one of the layers with an in-plane retarder axis lying normal to the plane of the drawing;

DETAILED DESCRIPTION

The present invention relates to the use of dielectric coatings with form birefringence, either as a stand-alone device or integrated with an in-plane retarder, to minimize the leakage intensity of an imager panel within limited cone angles, e.g. up to ±12°, through a pair of crossed polarizers.

If the periodic optical isotropic layers are larger than the molecular lengths, but are only a fraction of the operational wavelengths, anisotropy arises from the structure, whereby the c-axis of the negative uniaxial equivalent medium lies in the direction of layer stratification, i.e. parallel to the device normal. The extraordinary and ordinary indices of refraction are given by the $0^{th}$ order equivalent medium theory (EMT) to be:

$$n_o^2 = (1-f)(n_1)^2 + f(n_2)^2, \text{ and} \qquad (3)$$

$$\frac{1}{n_e^2} = \frac{(1-f)}{(n_1)^2} + \frac{f}{(n_2)^2}, \qquad (4)$$

where f is the ratio of the $n_2$ index layer thickness to the total thickness of $n_1/n_2$ pair; $n_1$ and $n_2$ are typically low and high index isotropic media. There are also second order EMT expressions, which include the ratio of paired thickness to the wavelength of light, in the effective $n_e$ and $n_o$ calculations. Nonetheless, the effects of taking the ratio of materials ($n_1$, $n_2$) on the overall effective birefringence can be included in numerical 2×2 matrix computations for dielectric thin films.

Figure 4A:
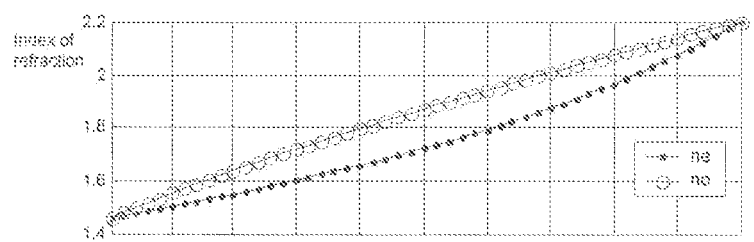
FIG. 4a is a plot of index of refraction vs $n_1$ duty cycle estimated with $0^{th}$ order EMT expressions, assuming $n_1=1.46$ and $n_2=2.2$.
Figure 4B:
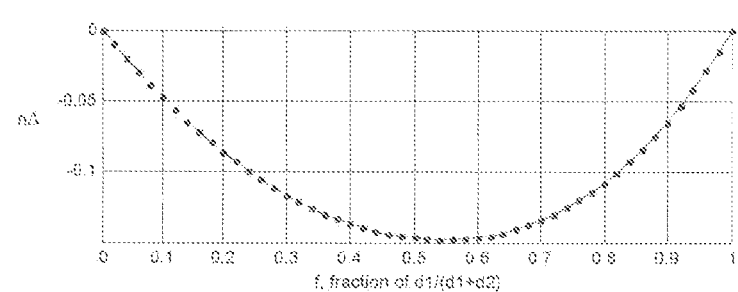
FIG. 4b is a plot of $\Delta n$ vs $n_1$ duty cycle estimated with $0^{th}$ order EMT expressions, assuming $n_1=1.46$ and $n_2=2.2$.

For example: taking Silica ($n_1$=1.46) and Tantala ($n_2$=2.20) dielectric coating materials in a sputtered coating, the resultant $n_e$ and $n_o$ indices, as well as the birefringence ($\Delta n = n_e - n_o$), are estimated with the zero$^{th}$ order EMT expressions (3) and (4) above. The relevant $n_e$, $n_o$ and $\Delta n$ values are plotted in FIGS. 4a and 4b, respectively. The largest $\Delta n$ can be realized by choosing a near 50:50 ratio, i.e. a near 50% duty cycle, of the two material layer thickness, at which point $n_o$=1.87 and $n_e$=1.72, giving a $\Delta n$ of -0.15. The form birefringence stack is likely to present an effective refractive index that is a mismatch to air, the glass substrates or subsequent dielectric layers. Consequently, the form birefringence (FB) stack has to be immersed in anti-reflection (AR) coatings on both sides, thereby forming a Form Birefringence Anti-Reflection (FBAR) stack.

The FBAR dielectric stack may be used as a stand-alone NCP compensator in a polarization-based projection system, or in combination with other discrete IPR compensators. A stand-alone FBAR trim retarder, illustrated in FIG. 5, includes a plane-parallel glass plate substrate 100, approximately 1 mm thick, and a series of alternating low and high index dielectric layers, e.g. 50 to 110 layers of each, defining a form birefringence coating 101, disposed on one side of the glass substrate 100. In order to reduce material interface reflections, AR coating layers 102 are added at the air/form birefringence coating interface, AR coating layers 103 are added at the form birefringence coating/glass substrate interface, and AR coating layers 104 are added at the glass substrate/air interface. An AR coating is any dielectric or polymeric stack serving as refractive index matching layers at an interface with an abrupt index change. The multi-layer stack of low and high index dielectric layers is composed of a plurality of layers with at least two materials, one of which has a first index of refraction and another of which has a second index of refraction. The multi-layer stack may have equal or unequal number of layers for each of the two or more distinct index materials. The multi-layer stack may consist of more than one periodic multi-layer stack, interspersed by other functional dielectric designs therebetween. The AR coatings themselves provide an additional out-of-plane retardance component, which must be factored in when the overall retardance and phase difference of the FBAR is being manufactured.

Figure 5:
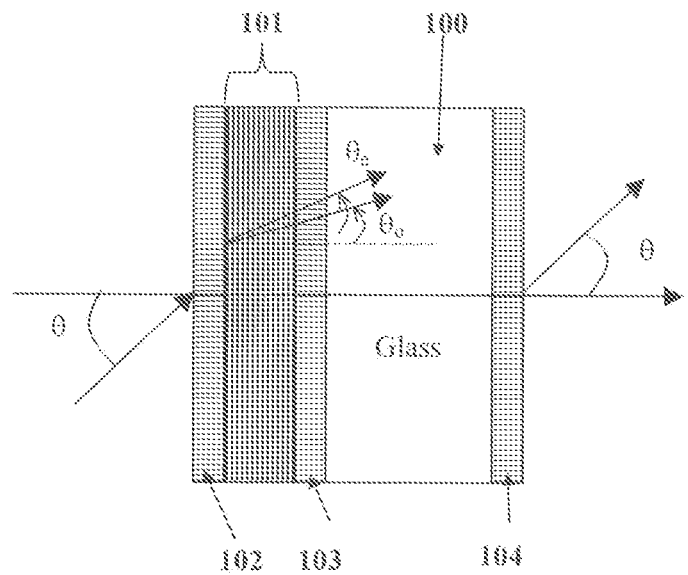
FIG. 5 illustrates a stand-alone negative c plate (NCP) with a single FBAR stack assuming to the present invention.
Figure 6:
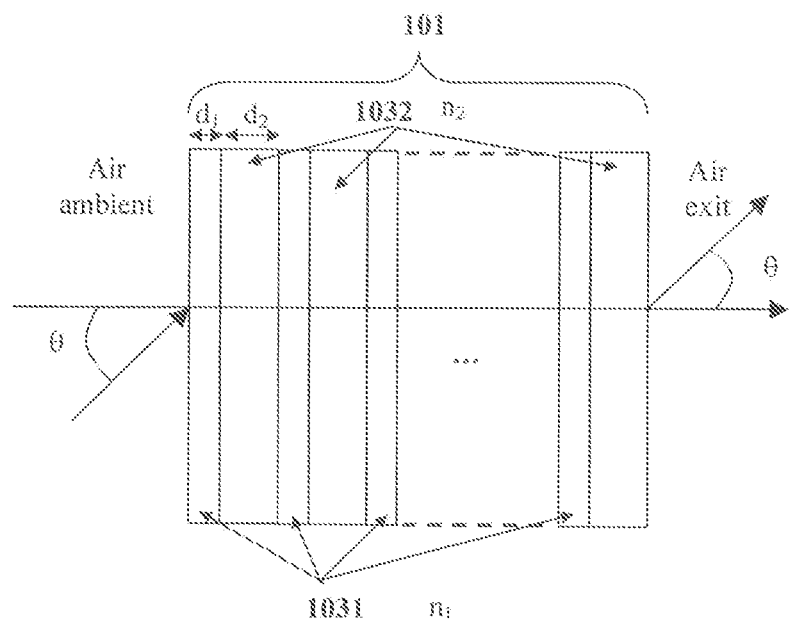
FIG. 6 illustrates an FB coating of FIG. 5.

With reference to FIG. 6, the form birefringent multi-layer dielectric stack 101 includes a first plurality of layers 1031, each having a first refractive index $n_1$ and a first layer thickness $d_1$ alternating with a second plurality of layers 1032, each having a second refractive index $n_2$ and a second layer thickness $d_2$. When the layer thickness is a fraction (e.g. 1/16 to 1/64) of the operating wavelength (e.g. $\lambda$=550 nm), a one-dimensional grating structure results and birefringence property of the coating stack arises. Stand-alone NCP and AP/NCP trim retarders, similar to the structures depicted in FIG. 5, have been evaluated using variable-angle spectro-ellipsometry (VASE) data collection and analysis, and the resultant retardation profile versus AOI in air was then fitted to the standard dual-layer retarder model. The stand-alone NCP retarder results are plotted in FIG. 7, in which the standard uniaxial material reference has $n_o$ and $n_e$ indices of 1.65 and 1.50, respectively, at $\lambda$=550 nm. The difference between theoretical and experimental results, fitted to the two-layer retarder model, is only about 10 nm throughout the band. The dielectric stack fabrication involving very thin layers (<20 nm) had been implemented with a very stable coating platform. An example of the net retardation profile versus AOI in air is shown in FIG. 8, for a trim retarder incorporating an O-plate IPR layer and FBAR NCP stack. Owing to the O-plate tilt, the single-pass net retardation profile varies according to the viewing azimuth plane. VASE data had been collected along the two principal, slow and fast axes, planes. Along the slow axis plane (also the tilt plane), the retarder shows a characteristic o-plate single-pass profile, as well as the decrease in net retardation with AOI, as a result of the FBAR NCP element.

Figure 3:
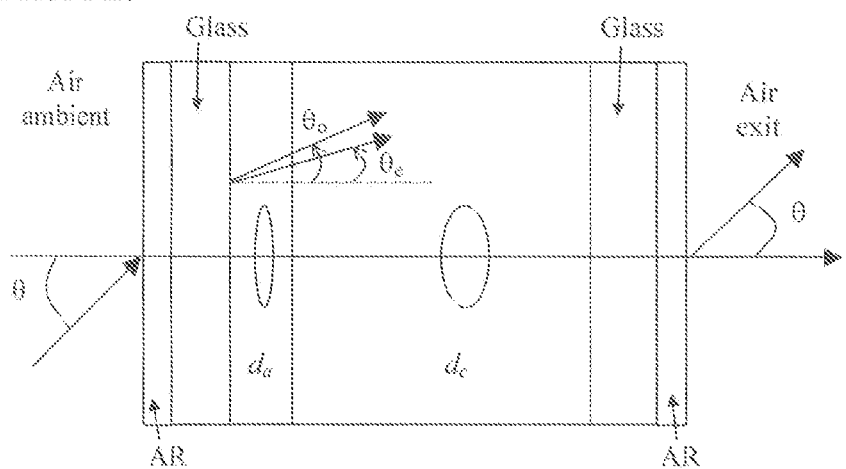
FIG. 3 is side view of a conventional A/C plate trim retarder.
Figure 9A:
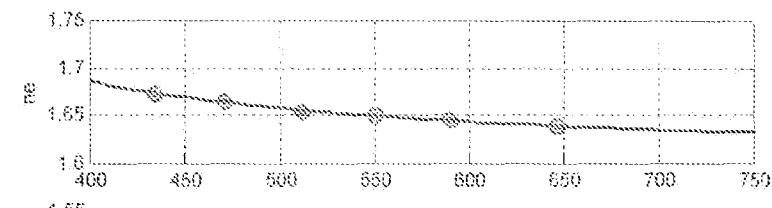
FIG. 9a is an extraordinary index of refraction profile of a conventional uniaxial material used in a dual layer A/C retarder model.
Figure 9B:
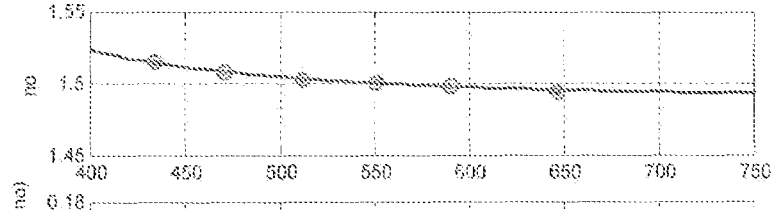
FIG. 9b is an ordinary index of refraction profile of a conventional uniaxial material used in a dual layer A/C retarder model.
Figure 9C:
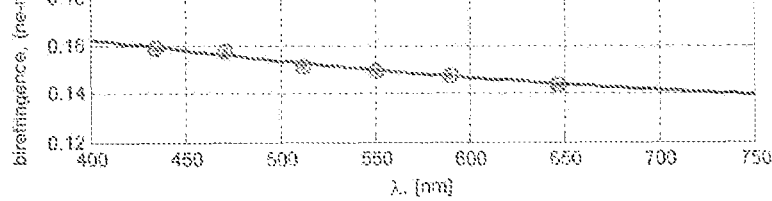
FIG. 9c is a birefringence dispersion profile of a conventional uniaxial material used in a dual layer A/C retarder model.
Figure 10:
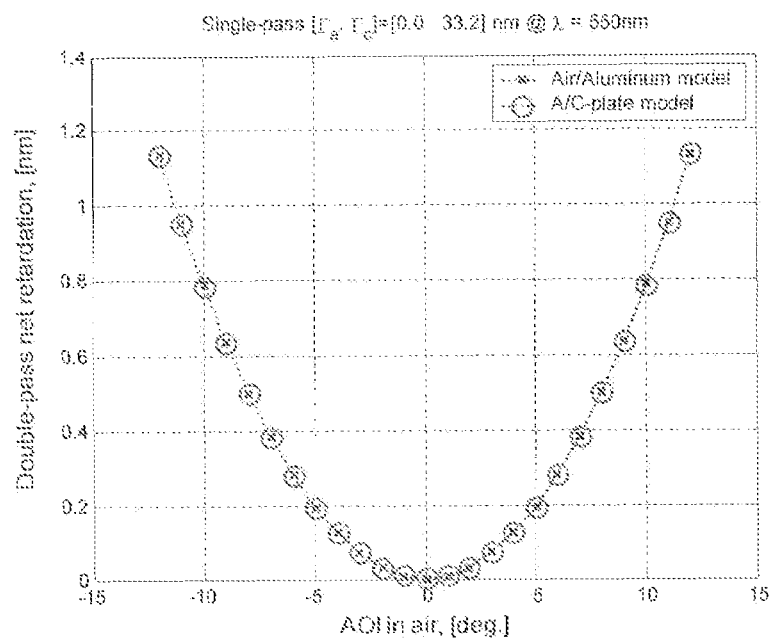
FIG. 10 is a calculated retardation profile vs angle of incidence at an air/aluminum reflector interface.

The layer thickness of the dielectric coating materials $n_1$ and $n_2$ are chosen to create a suitably large birefringence, such that the dispersion across a band of wavelength is minimized or tailored to system requirements. The resultant effective $n_0$ and $n_e$ refractive indices may not be suitable for direct contact with the other optical media, e.g. air, substrate; however, as stated above, the remedy for index mismatches is to add AR layers on either side of the multi-layer stack. According to the present invention the effective off-axis effects of the imager panel are equated with those of the trim retarder. The angular spread of off-axis rays in a high index FBAR equivalent medium, e.g. $n_o$ and $n_e$ values of approximately 2.0, is less than the corresponding values typically found in an LC medium, e.g. $n_o$ and $n_e$ values of approximately 1.5 to 1.65. Therefore, unlike the prior art, the birefringence-layer length product, i.e. $\Delta nd$, of the FBAR stack has to be appreciably larger than the corresponding c-plate $\Delta nd$ of the imager panel LC-layer to obtain the same amount of phase difference. According to the present invention, FBAR c-plate retardation effects are benchmarked against a reference negative uniaxial medium having standardized indices: $n_o$=1.65 and $n_e$=1.50 @ $\lambda$=550 nm, using a dual-layer retarder model as shown in FIG. 3. Similarly, the off-axis effects of the imager panel are benchmarked against a positive uniaxial medium having $n_o$=1.50 and $n_e$=1.65. The reference birefringent media may also incorporate index and birefringence dispersions across the wavelength range of interest, such as plotted in FIGS. 9a to 9c. Referencing the panel retardation to a standard uniaxial medium has the added advantage that the retardation is a measurable macroscopic effect of the layer, without the need to obtain panel LC material constants. The measured retardance of a reflective LCOS also includes the off-axis effects of a metallic reflector. The calculated retardation profile of an Air/Aluminum reflector interface is shown in FIG. 10. The aluminum substrate had a complex index of (0.985–6.67i) @ λ=550 nm, and the fitted c-plate retardance is approximately 66 nm on reflection. In a typical LCOS construction, the aluminum reflector is immersed in a higher index medium, such as LC or an LC alignment layer. Consequently, the effective angles of rays impacting on the aluminum interface are reduced. The off-axis effect of the metal reflector at the silicon backplane, such as aluminum, is greatly reduced.

Figure 11:
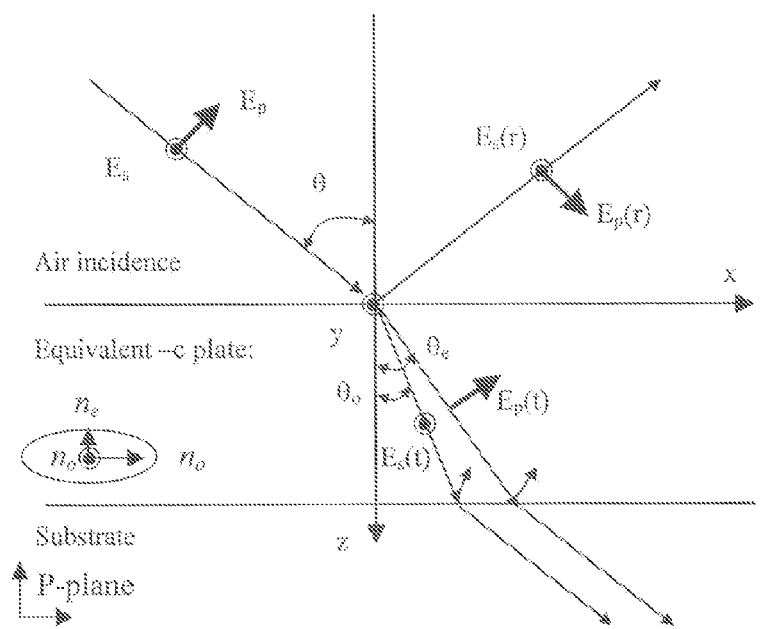
FIG. 11 illustrates double refraction in a FBAR stack.

With reference to FIG. 11, the birefringence of the FBAR stack arises as the following. For an input incidence consisting of 's' and 'p' polarized light, the 's' polarized light sees the '$n_o$' index whereas the 'p' polarized light sees an effective index, which is a function of the '$n_o$' and '$n_e$' indices. The 's' polarized light component propagates as the ordinary wave, and the 'p' polarized light component propagates as the extraordinary wave in the FBAR equivalent uniaxial c-plate. The eigen-modes and eigen-indices of the two waves are given by the expressions as follows:

$$\sigma_p(\theta) = n_o\sqrt{1 - \frac{\sin^2(\theta)}{n_e^2}} = n_{\text{eff}}(\theta_e)\cos(\theta_e), \text{ and} \quad (5)$$

$$\sigma_s(\theta) = n_o\sqrt{1 - \frac{\sin^2(\theta)}{n_o^2}} = n_o\cos(\theta_o), \quad (6)$$

where, θ is the angle of incidence in ambient air, $n_o$ and $n_e$ are the effective ordinary and ordinary refractive indices of the FBAR stack, which are constants at a given wavelength; $\theta_o$ and $\theta_e$ the equivalent double refraction angles in the equivalent FBAR c-plate; the eigen-index of the ordinary wave is a constant at a given wavelength, whereas the eigen-index of the extraordinary wave is a function of $\theta_e$ other than the trivial case of normal incidence. Even at grazing incidence from air, the p-polarized wave does not experience the full $n_e$ index, and $n_e \sin(\theta_e) \neq \sin(\theta)$.

Figure 12:
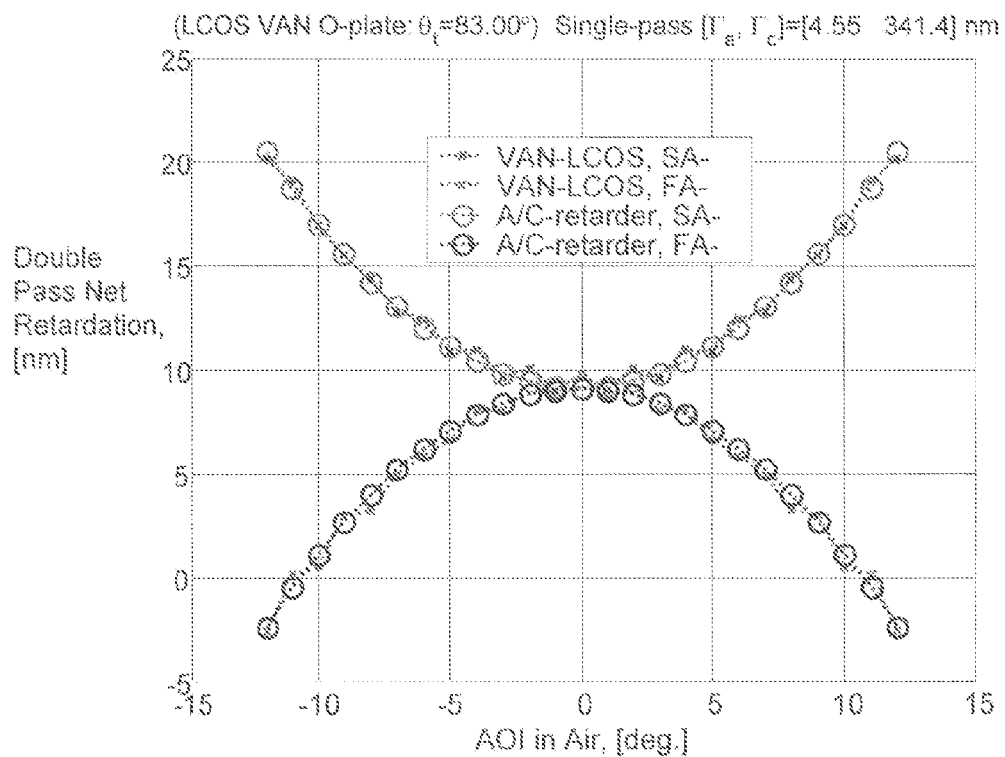
FIG. 12 are net retardation profiles along and orthogonal to the tilt plane of a VAN-mode LCoS panel.

An example of a retardation compensation approach according to the present invention is as follows: the retardation profiles of an 83° tilt VAN-mode LCOS device and an FBAR trim retarder element are fitted with an A/C or A/–C dual-layer equivalent retarder model. The LCOS has an LC layer between a Corning 1737F cover glass and an Aluminum substrate. The glass plate has a nominal index of refraction of 1.52 at λ=550 nm. The LC-layer uses the standard uniaxial positive medium of $n_e$=1.65 and $n_o$=1.50 at λ=550 nm, with a thickness of approximately 2.35 μm to provide for about 4.5 nm of in-plane retardance (single pass). The air/glass interface has a nominal broad-band AR design. The fitted results, along and orthogonal to the VAN-mode tilt plane, are plotted in FIG. 12. The equivalent retarder model includes an a-plate and a positive c-plate (PCP) layer, both utilizing the standard uniaxial material indices, sandwiched between two AR-coated Corning 1737F glass plates. The LCOS device model has 83° uniform LC director tilt and an intrinsic LC birefringence of 0.15. The LCOS device is fitted to be equivalent to an A/C retarder having 4.5 nm and 340 nm of in-plane and out-of-plane retardance, respectively. The in-plane retardance is the net retardance of the model at normal incidence. The 4×4-matrix computation employed here, includes interference and reflections at the layer interfaces. In order to compensate for the LCOS retardation components of 4.5/340 nm, prior art teaches a trim retarder having an in-plane component of ~4.5 nm and an out-of-plane component of approximately –340 nm. The in-plane component is obtained by using either an a-plate or an o-plate birefringent element, having its slow axis aligned orthogonal to the VAN-LCOS tilt plane, thus forming a crossed-axes pair. The out-of-plane component of –340 nm can be obtained, for example, with an FBAR element according to the present invention. The FBAR element may be a stand-alone compensator or form an integral part of a full-function trim retarder. Other negative c-plate elements, which shall be disclosed in the following, may also replace the FBAR functions. In addition, it shall be shown that the prior-art teachings of A/–C-plate trim retarder design do not result in optimal compensation.

Figure 13:
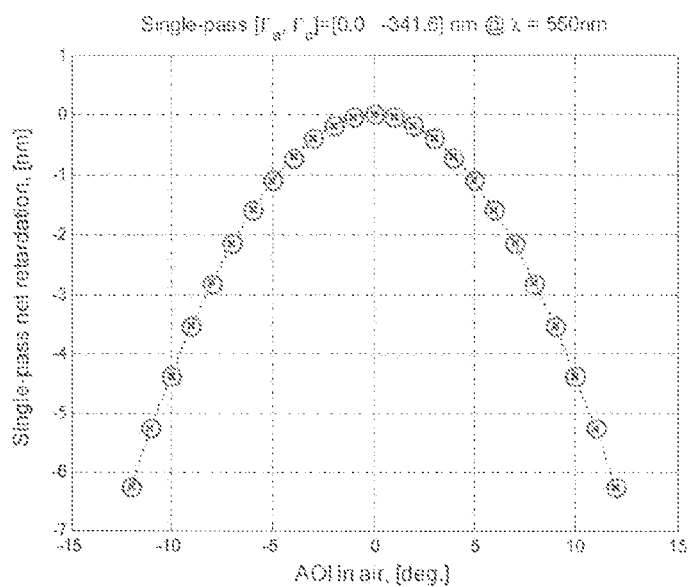
FIG. 13 is a net retardation profile of an FBAR stack vs angle of incidence.

As an example, an FBAR element in the form of a stand-alone compensator, of the type shown in FIG. 5, uses 71 pairs of Tantala and Silica layers, having nominal indices of 2.20 and 1.46 at λ=550 nm, respectively. A large difference, e.g. greater than 0.5 and preferably greater than 0.7, between $n_1$ and $n_2$ is selected to maximize the birefringence and minimize the thickness of the coating. AR layers are added to reduce reflections between the periodic thin layer stack with air and Corning 1737F glass on either side. The reverse side of the glass is also AR coated. The retardance profile of the FBAR stack, evaluated over the same ±12° AOI range in air, is plotted in FIG. 13. Note that within the cone angles, the FBAR stack provides for a net retardation of approximately –6.3 nm to 0 nm single pass, whereas the VAN-mode LCOS gives rise to approximately 5.7 nm to 0 net retardation, single pass. In terms of the birefringence of the effective indices, the VAN-mode LCOS and the FBAR stack have a Δnd product of:

$\Delta n_c d(LCOS)=0.147*2350$ or ~340 nm, $\Delta n_c d(FBAR)=-0.147*71*40$ or ~-415 nm, In which $\Delta n_c$ is the effective out-of-plane birefringence: in the case of VAN-mode o-plate, it is the uniaxial projection onto the z-axis; in the case of the FBAR stack, it is the difference of effective ($n_o$, $n_e$) indices. Accordingly, because the refractive indices $n_1$ and $n_2$, the resultant effective out of plane refractive indices $n_o$ and $n_e$ are larger than the corresponding refractive indices of the LCoS panel, which causes the angle spread for an e-wave and an o-wave, and the actual phase difference in the FBAR stack to be less than that in the LCoS panel. Hence, the phase anisotropy is reduced and the thickness of the FBAR stack has to be increase to get the required phase difference at the exit thereof.

Figures 14A, 14B, 14C:
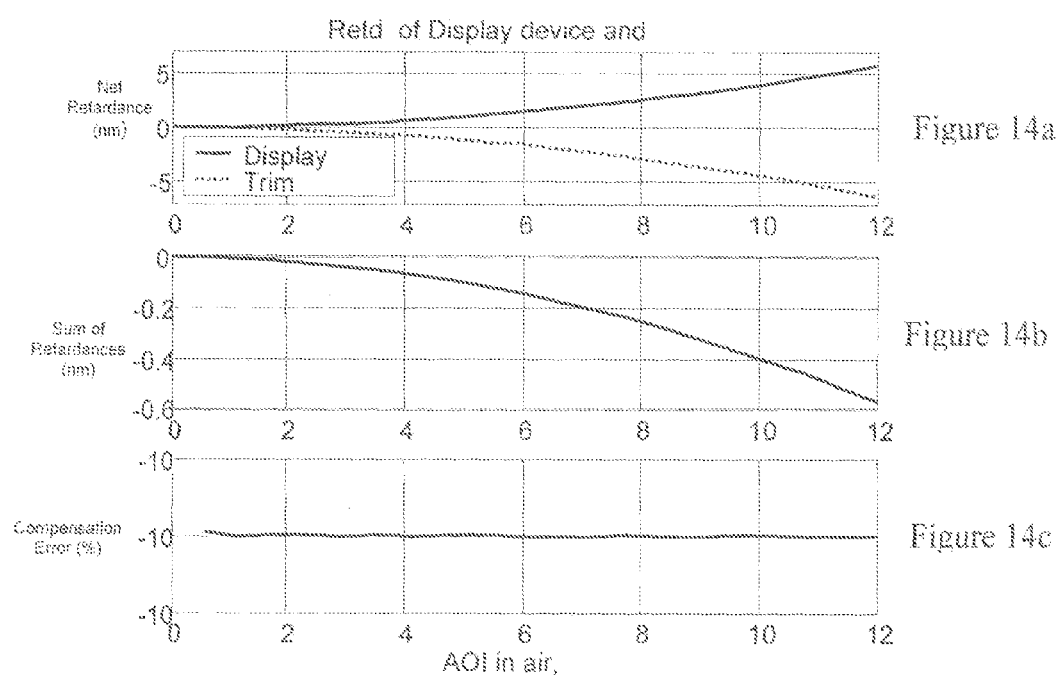
FIG. 14a shows the net retardation variations of a positive and a negative c-plate element with air angles of incidence.
FIG. 14b denotes the sum of net retardations of a positive and a negative c-plate element with air angles of incidence.
FIG. 14c presents the error of compensation as a fraction of the positive c-plate retardance when the $\Delta nd$ products of the positive and negative c-plate elements are matched.

Evidently, the aforementioned FBAR example, providing for –415 nm c-plate retardance in terms EMT effective indices or –340 nm in terms of the standard uniaxial material model, does not provide for an adequate off-axis compensation of the 4.5/340 nm VAN-mode LCOS (IPR compensated for separately). From the expressions of eq. (5) and (6), the net retardances for a given off-axis ray, where in the LCOS device, $\{n_o,n_e\}$ material set is assigned $\{1.50, 1.65\}$ @ λ=550 nm and in the trim retarder device, $\{n_o,n_e\}$ material set is assigned $\{1.65, 1.50\}$ @ λ=550 nm, does not sum up to zero. The general angular profiles of the net retardances in the positive and negative C-plate elements, with matched lower and higher eigen-indices are shown in FIGS. 14a to 14c. With this matched index condition, the sum of positive and negative net retardances, at any given angle of incidence, deviates by approximately $1-n_{o(Lcos)}/n_{o(FBAR)}$ or –10% as a fraction of the LCOS c-plate compensation target.

Figure 16A:
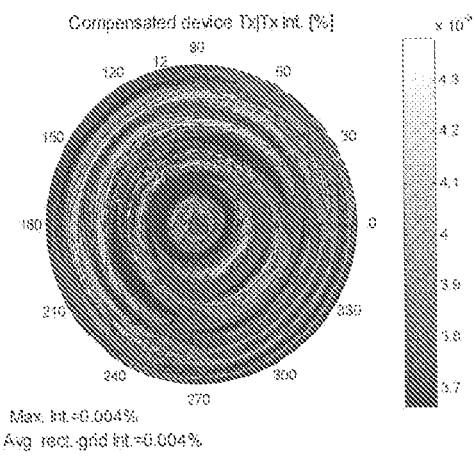
FIG. 16a is a conoscopic leakage profile of a compensated device according to the present invention.
Figure 16B:
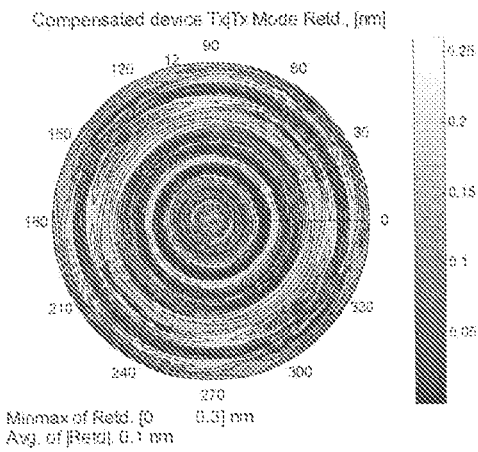
FIG. 16b is a conoscopic residual retardance profile of a compensated device according to the present invention.
Figure 16C:
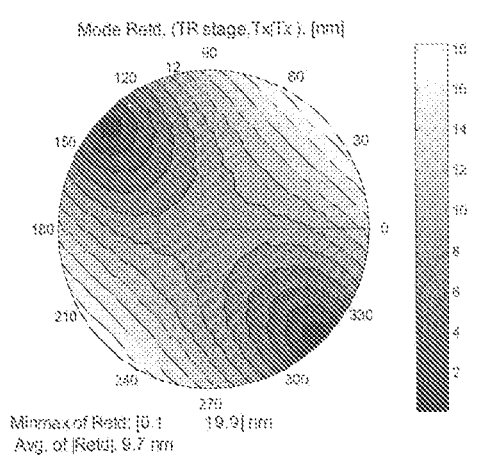
FIG. 16c is a conoscopic mode retardance profile of a trim retarder according to the present invention.
Figure 16D:
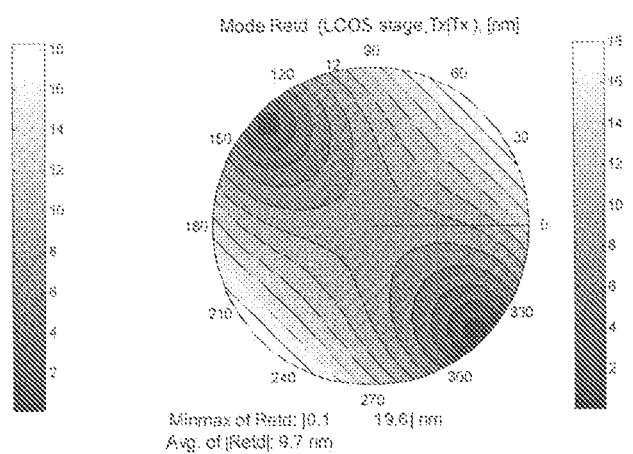
FIG. 16d is a conoscopic mode retardance profile of an LCoS panel.

Accordingly, the proper –C-plate component in the trim retarder, for removing the residual retardance of a 4.5/340 nm VAN-mode LCOS, should be approximately −340/($n_{o(FBAR)}$/$n_{o(LCos)}$)=−340/1.1 or −310 nm. Without an NCP element in the trim retarder compensator, the compensated LCOS device has ring-like (more precisely oval-shaped) net retardance profile, as shown for ±12° cone angles in FIG. 15b. The associated conoscopic crossed-polarization leakage profile is depicted in FIG. 15a—the so-called isogyre cross is evident along the input and exit polarizer directions where only a single mode of propagation exists. The cone-average contrast of this compensated device (assuming an On-stage intensity of 100%) is no better than 2000:1. The conoscopic A-plate retardance, with its slow axis aligned at 135° is shown in FIG. 15c, depicting a weak variation with polar angles. The mode retardance profile of the O-plate birefringent layer in the VAN-mode LCOS, as shown in FIG. 15d, has 180° symmetry in double-passing. The combination of an A-plate trim retarder and an O-plate LCOS device, wherein the residual a-plate is completely removed, results in the oval-shaped conoscopic net retardance profile. By introducing an appropriate amount of −C retardance component (~−310 nm in this case), the field of view is increased, as evidenced in the conoscopic leakage plot of FIG. 16a. The NCP element is implemented with an FBAR design including 48 pairs of 19 nmH/21 nmL, where H and L are Tantala and Silica of 2.3 and 1.5 refractive indices, respectively. The conoscopic leakage net retardance (FIG. 16b) profiles are uniformly low, with slight ring-like perturbation. This is evidence that an A/−C plate compensator is suitable for complete residual retardance removal of a VAN-mode LCOS having a very high tilt (83° in this example). The NCP element in the trim retarder is radially symmetric, whereas the PCP retardance of the high-tilt VAN-mode LCOS is close to being radially symmetric. The individual conoscopic mode retardance profiles of the trim retarder and the LCOS stages (FIGS. 16c and 16d) reveal closely matched mode retardance at any given ray angle.

Figure 17:
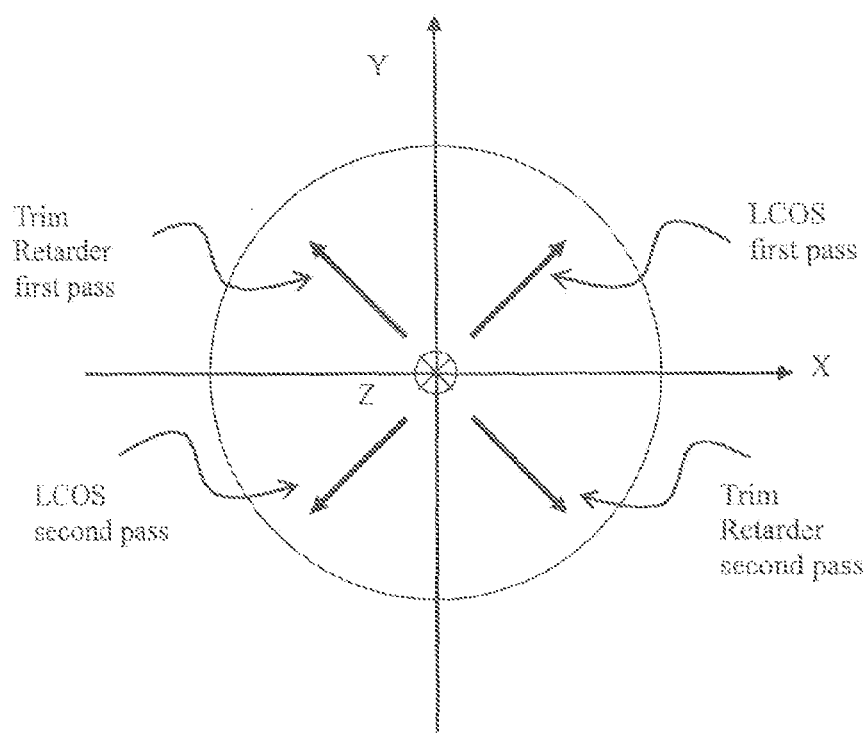
FIG. 17 illustrates the orientations of positive tilt sense for reflection viewing of a compensated device.

A problem with the above A/−C plate trim retarder design is that, although the forward compensation contrast is very high (>25 k:1), the reflection off the front-face of the trim retarder impose an overall contrast limit of ~2000:1 even for a low-value 4.5 nm A-plate retarder. There are various ways to reduce the reflection, i.e. reducing the Δn of the LCP layer in the A plate, as disclosed in copending patent application 60/529,315 filed Dec. 11, 2003; 60/587,924 filed Jul. 14, 2004; and 60/589,167 filed Jul. 19, 2004. An alternate scheme is to employ an O-plate retarder medium to realize the A-plate component. It is well-known that an optimally compensated LC-device with a tilt-plane requires that all four quadrants of the viewing cone encounter compatible out-of-plane tilt of a uniaxial medium [H. Seiberle, K. Schmitt and M. Schadt, "Multidomain LCDs and Complex Optical Retarders Generated by Photo-alignment," Proc. Eurodisplays '99, pp. 6–9, September, 1999]. With a two-stage compensator-LCOS device, oriented substantially parallel to each other in double-pass transmission, this four-domain structure can be easily synthesized by crossing the tilt-plane of an O-plate trim retarder with the tilt-plane of VAN-mode LCOS. The orientations of positive tilt sense for reflection viewing of the compensated device is shown by the diagram in FIG. 17, for the nominal case of matching a-plate retardance components of LCOS and trim retarder. The tilt sense of the first and second passes of LCOS and trim retarder could be offset by 90° or 180°, as long as they interleave by a nominal 90° and populate all four quadrants of the viewing cone.

A set of calculated compensation results for a 65° trim retarder O-plate and the abovementioned 83° VAN-mode LCOS are shown in FIGS. 18a to 18d. The trim retarder out-of-plane tilt of 65° is a practical, average tilt of splayed O-plate LCP retarder; whereas the tilt angle of the VAN-mode LCOS is likely to be very high (>80°). Even in this case of unmatched LCOS and trim retarder out-of-plane tilts, the compensated device has a very small degradation, in comparison to the previous case of A/−C trim retarder compensator. At 65° tilt, the amount of C-plate retardance induced by the LCP layer is about 22 nm (5× of A-plate component), which requires ~−20 nm of NCP compensation. The FBAR stack in this case includes 51 pairs of 19 nmH/21 nmL, giving a net trim retarder c-plate component of ~−310 nm. With a 65° LCP tilt, the reflection contrast limit is pushed out to several tens of thousands to one. It can be seen that the individual conoscopic mode retardance profiles of the trim retarder and the LCOS stages (FIGS. 18c and 18d) are still closely matched over the entire ±12° viewing cone.

Figure 19:
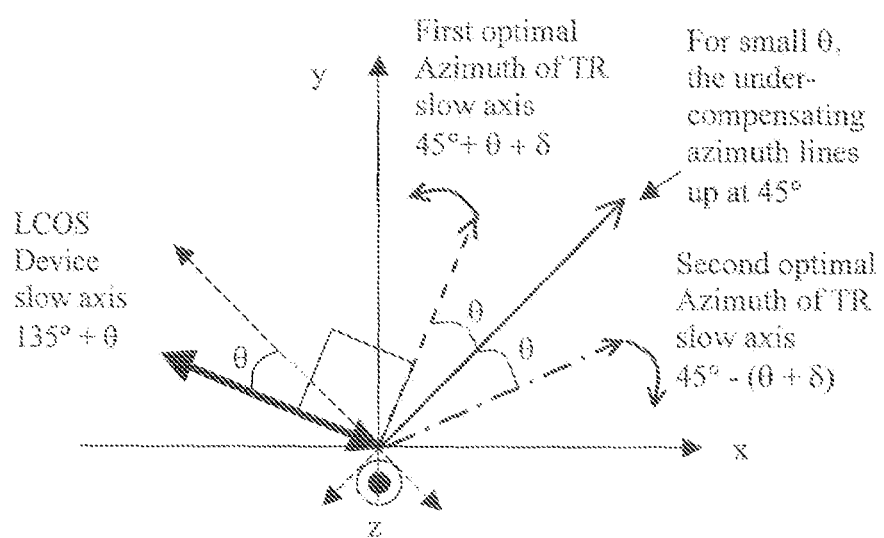
FIG. 19 illustrates a generic relationship between A-plate components of a trim retarder and an LCoS and the system P-polarizer and S-analyzer.
Figure 20A:
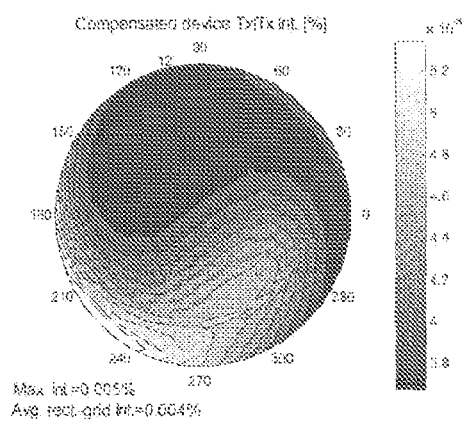
FIG. 20a is a conoscopic leakage profile of a compensated device according to the present invention.
Figure 20B:
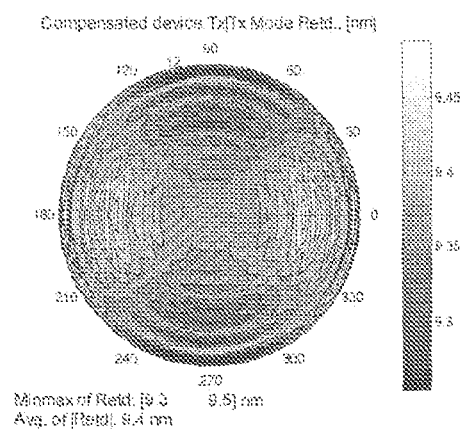
FIG. 20b is a conoscopic residual retardance profile of a compensated device according to the present invention.
Figure 20C:
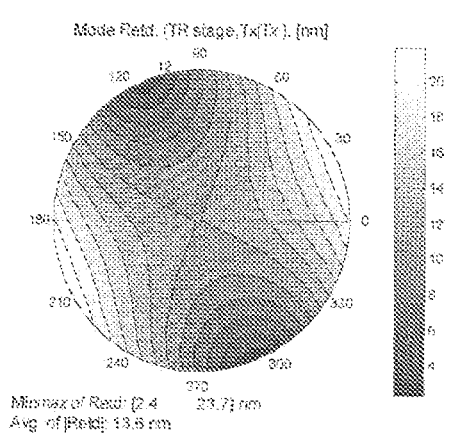
FIG. 20c is a conoscopic mode retardance profile of a trim retarder according to the present invention.
Figure 20D:
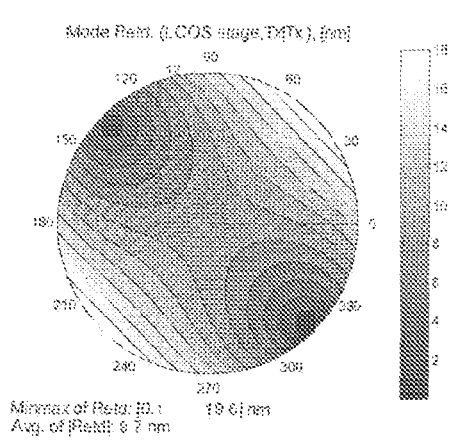
FIG. 20d is a conoscopic mode retardance profile of an LCoS panel.

Due to the manufacturing tolerances of the LCOS and the trim retarder, the values of in-plane retardance of both elements may vary by tens of percentages from part to part. A convenient technique to ensure adequate IPR compensation is to always utilize a substantially higher in-plane value trim retarder to pair up with any given LCOS panel, where the trim retarder is 'clocked-in' by rotating its azimuth orientation away from the crossed-axes arrangement. A generic relationship between the a-plate components of trim retarder and LCOS and the system p-polarizer (parallel to x-axis) and s-analyzer (parallel to y-axis) is shown in FIG. 19. The c-plate component is rotationally invariant, if realized by an FBAR stack or a true negative uniaxial plate. When the trim retarder is under compensating the LCOS, there is only one optimal trim orientation (for an LCOS axis at 135°+$θ_1$ |θ|<22.5°). The trim retarder axis is not crossed with the LCOS axis, rather the trim retarder azimuth lines up at 45°, bisecting the 'p' and 's' planes. When the trim retarder value just matches the LCOS retardation, two azimuth solutions emerge: the first aligns the trim at crossed-axes with the LCOS whereas the second has the trim retarder and LCOS at mirrored orientations with respect to the y-axis, i.e. an over-clocking angle of 2θ. When the LCOS axis lines up with ±45°, the two solutions merge into one. In the case of over-compensation, the two trim retarder azimuth solutions bisect the 45° directions. The angle offsets (either δ or −(2θ+δ) for solutions #1 and #2, respectively) increase with the retardation mismatches. The over-clocking angle, δ, is approximately given by, $\cos^{-1}[\Gamma_a(TR)/\Gamma_a(LCOS)]/2$, assuming approximately $\cos^2(δ)$ retardance projection in the intended azimuth.

Figure 21:
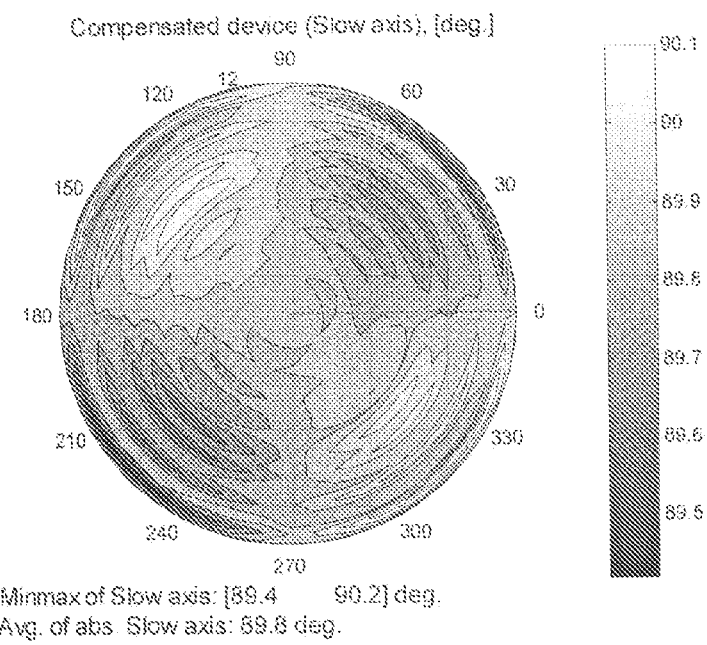
FIG. 21 is a conoscopic slow-axis profile of the residual retardation in a compensated device according to the present invention.

An example of a 4.5/340 nm VAN-mode LCOS device, compensated with a 6.5/−310 nm mismatched-AP O/−C plate trim retarder is shown by the results in FIGS. 20a to 20d. Due to the increased A-plate component of the trim retarder, the associated increased in PCP (~5*6.5 nm or 33 nm) in the trim retarder requires an additional −30 nm of NCP in the FBAR stack. An FBAR stack including 53 pairs of 19 nmH/21 nmL is used. The overall conoscopic leakage profile is uniform as shown in plot (a). However, the net retardance of any given ray traversing the trim retarder/LCOS in double-pass is no longer near zero. In this example, almost 9.5 nm of net retardance remains for any given ray, with the TR slow axis clocked an additional ~23° from the crossed-axes alignment to LCOS slow axis. Fortunately, the fast/slow axes of this net retardance are very closely aligned to the system 'p' and 's' directions, resulting in negligible birefringence effects (FIG. 21). The conoscopic mode retardance of the 6.5/−310 nm trim is not a mere rotated version of the previous 4.5/−310 nm O/−C trim retarder (compare FIGS. 20c and 18c). The effects of non-rotationally symmetric PCP (due to LCP O-plate) and the rotationally symmetric NCP (due to FBAR stack) combined to give a mode retardance profile as FIG. 20c. The clocked trim retarder/LCOS retarder pair then produces magnitude and axis orientation maps as given in FIGS. 20(b) and 21.

Accordingly, the out-of-plane component of the VAN-mode LCOS is optimally compensated for by the FBAR stack, assuming there is no other birefringent element in the display system giving rise to in-plane and out-of-plane retardation components. An optimal trim retarder solution requires a computer optimization and/or with experimental iterations of the complete polarization-based projection system including the trim retarder, the LCOS panel, polarizers, analyzers, polarization beam splitters and any other polarization sensitive elements.

Figure 22:
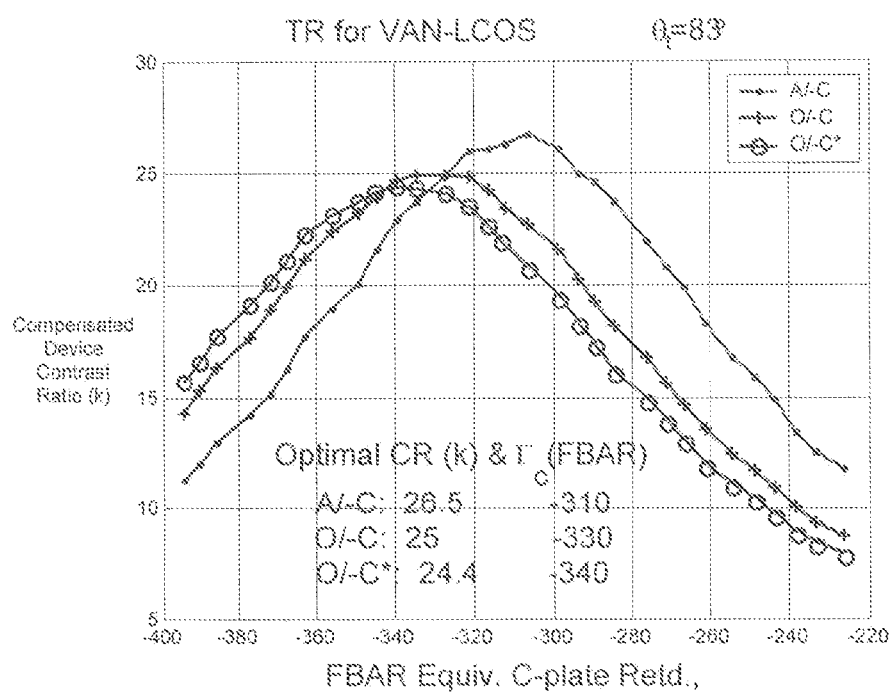
FIG. 22 is a plot of contrast vs FBAR equivalent –C retardation for various trim retarder designs.

With just the VAN-mode LCOS and an O/−C plate trim retarder in an optical system, the number of periodic H/L thin-layer pairs has been varied in a fine NCP granularity manner in order to probe the sensitivity of the compensated paired devices with respect to the NCP retardance targeting. The results of A/−C and O/−C plate trim retarder designs for the same 4.5/340 nm VAN-mode LCOS are shown in FIG. 22 (the case of mismatched AP compensation is denoted by O/−C*). It is clear that the forward compensation contrast is as good for any of the three examples. In practice the very high forward compensation contrast (~25 k:1) is set back by a slew of leakage mechanisms in a display system, collectively lumped as the baseline contrast of the optical system. It is typical to achieve between 6 k:1 and 10 k:1 system baseline contrast for a wire-grid PBS based projection system. In this case, the sensitivity of the C-plate retardance variation is mitigated and an overall system contrast greater than 4000:1 can be obtained (parallel contributions of ⅙ k and ½₅ k and at least 50 k:1 reflection contrast).

Accordingly, in the four calculation examples above, a step-by-step trim retarder compensator design has been presented. First, a prior-art A-plate-only trim retarder, with an exactly matched a-plate retardance to that of the VAN-mode LCOS is presented. Second, the lack of field of view is compensated by incorporating a novel FBAR thin-film stack into the trim retarder. Third, the lack of reflection contrast is overcome by utilizing an effectively low in-plane birefringence retarder design. The practical compensation match-up where the trim retarder a-plate component is substantially larger than the corresponding component of the LCOS is illustrated in the fourth example. The last example represents the preferred embodiment for working with typical manufacturing tolerances.

Accordingly, as evidenced by the aforementioned examples is: a) there is no need to deduce the actual layer thickness and the associated ($n_e$, $n_o$) indices of the LCOS LC layer; b) there is no need to deduce the optical constant of the metal reflector at the silicon backplane; c) the c-plate $\Delta$nd product of LCOS is in general unequal in magnitude to the c-plate $\Delta$nd product of the FBAR negative c-plate, or any negative c-plate element in the trim retarder; d) it is not desirable, nor necessary, to equate the effective ($n_e$, $n_o$) index set of the LCOS device and that of the FBAR stack, i.e. $n_e(LCOS)=n_o(NCP)$ and $n_o(LCOS)=n_e(NCP)$ conditions are redundant; and e) it is not desirable, nor necessary, to equate the actual physical lengths of the LCOS device and that of the FBAR stack, i.e. $d(LCOS)=d(NCP)$ condition is redundant.

A compensated display system requires optimal c-plate element that equates the off-axis effects of the LCOS device and the compensator device. Although not shown in examples here, the structure, 157, the half wave structure, 156, and phase adjusting layers of the FB stack, 159, are optimized to meet the reflectance and retardance targets over the wavelength band of interest. The number of layers required depends on their physical thickness, the effective $\Delta n$ and the amount of desired retardance, e.g. for layers 5 nm wide with an effective $\Delta n$ of 0.15 over 500 pairs to provide 1000 nm of retardance; however, only approximately 10 pairs will be required to provide 10 nm of retardance. A range between 50 and 110 pairs of high index/low index is preferred.

Figure 25A:
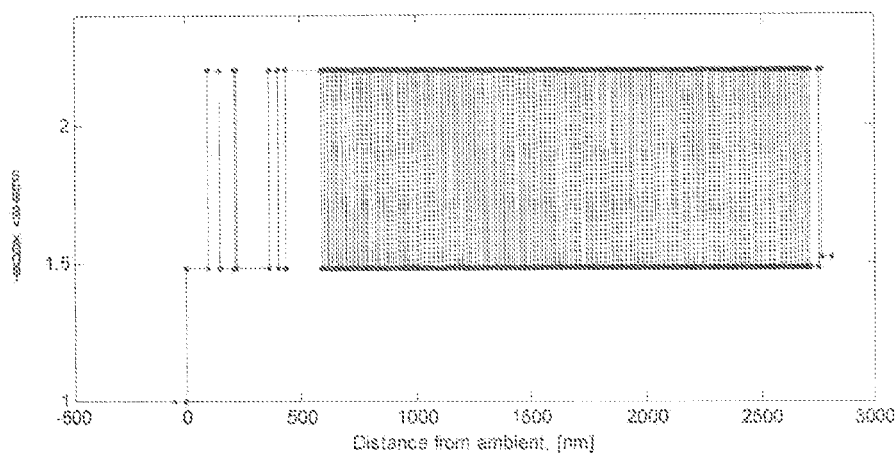
FIG. 25a illustrates a refractive index profile for an FBAR stack with the form birefringence stack integrated into the AR coating.
Figure 25B:
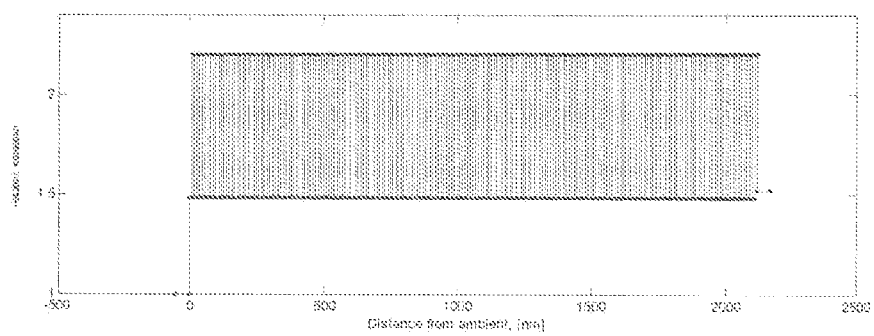
FIG. 25b illustrates a refractive index profile for a standard FB stack.
Figure 26:
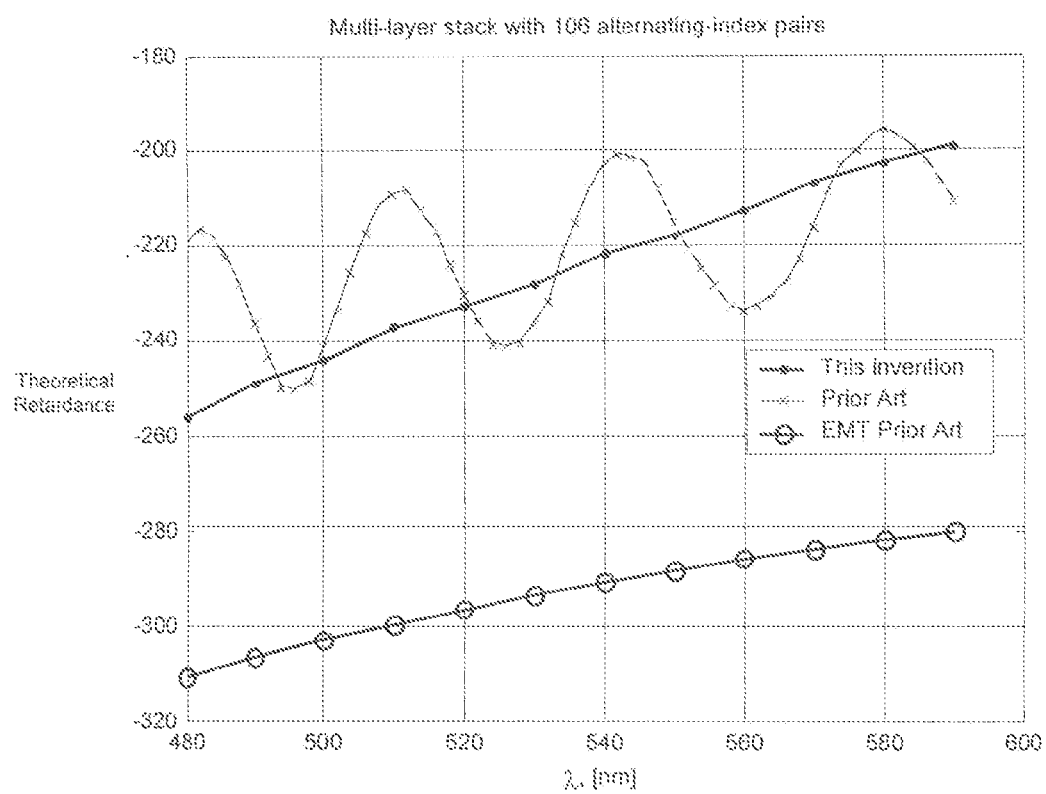
FIG. 26 is a plot of retardance vs wavelength for conventional –C plate trim retarders and –C plate trim retarders according to the present invention.

FIG. 25a illustrates the refractive index profile for an FBAR stack according to the present invention, compared with that of the form birefringent stack without AR coatings, illustrated in FIG. 25b. FIG. 26 illustrates the highly variable retardance of a conventional −C plate trim retarder (the trace marked 'Prior Art') across the visible spectrum compared with the relatively stable retardance of the trim retarder according to the present invention. ('This invention'); both sets of results are fitted to equivalent $n_o=1.65$ and $n_e=1.50$ indices. The retardance profile, according to zeroth order EMT expressions, is plotted as the 'EMT Prior Art' trace.

Figure 27:
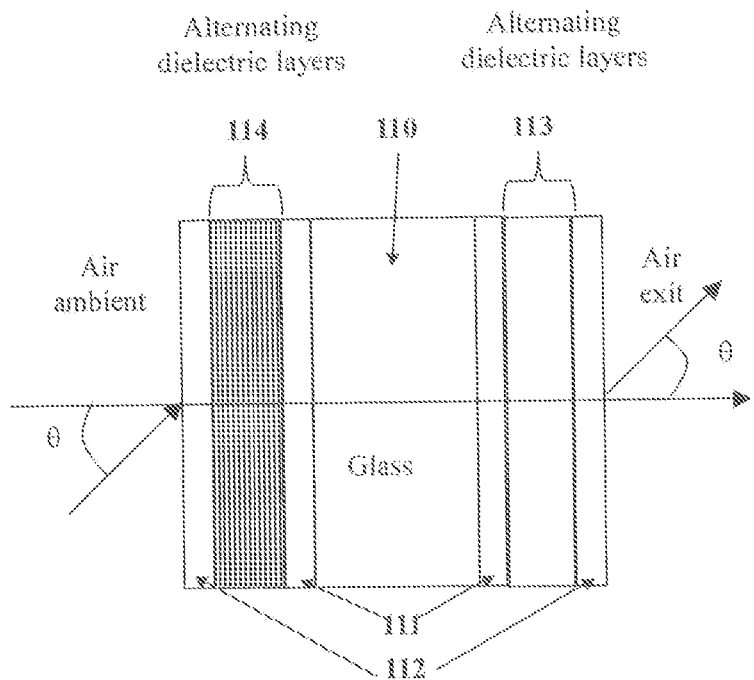
FIG. 27 is a side view of an alternative embodiment of the present invention including two FBAR stacks.

Yet another embodiment of the stand-alone NCP involves the splitting of the required retardance into two separate FBAR stacks 113 and 114, coated on opposite surfaces of a glass substrate 110, as illustrated in FIG. 27. Again, AR layers 111 and 112 are provided to reduce the reflections. Alternatively the form birefringent stack could be incorporated into AR coating, as in FIGS. 23 and 24. Radially-symmetric C-plate retardance, such as those given by an FBAR stack, can be linearly superposed. Accordingly, a plurality of FBAR stacks, coated on multiple substrates can be cascaded in parallel, without any relative azimuth orientation constraint. Moreover, c-plate trim retarders can be cascaded on a single side of reflective imager or positioned on one or opposite sides of a transmissive imager.

The full scope of contrast enhancement, by incorporating a trim retarder into a polarization based display system, can only be realized with both IPR and OPR compensation. An emerging trend in polymeric IPR compensation is to utilize a spin-coated LCP on an LPP alignment layer; however, the lack of negative birefringence LCP, compatible with the spin-coating process, does not allow for the full compensation of the imager at off-axis illumination. By integrating the FBAR stack with an LCP/LPP layer sequence, a full-function A-plate/negative C-plate (AP/NCP) trim retarder, which compensates for imager IPR and increases the display system field of view, results. A C component of the LCP/LPP structure is determined and factored into the final design of the FBAR stack to ensure the desired compensation is provided.

Figure 28:
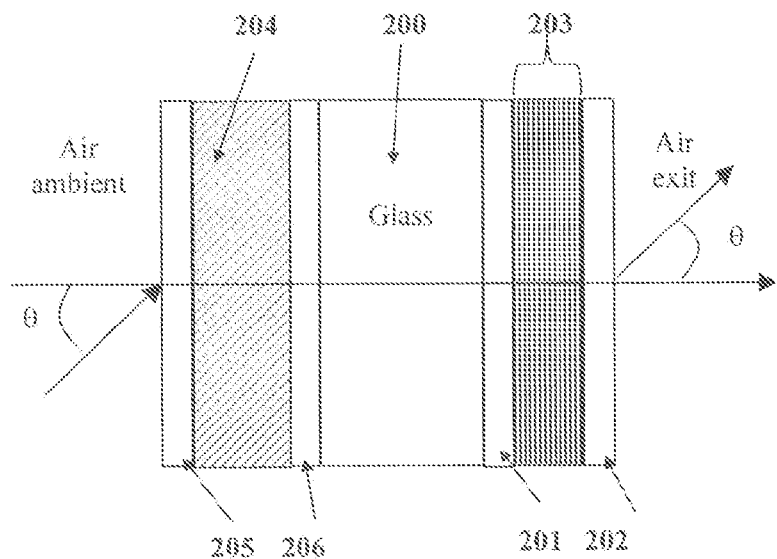
FIG. 28 is a side view of an alternative embodiment of the present invention including an FBAR stack and an a-plate on opposite sides of a substrate.

A preferred embodiment of an AP/NCP trim retarder, incorporating a FBAR stack is illustrated in FIG. 28, and includes series of alternating index layers, forming the form birefringence stack 203, bounded by index matching AR layers 201 and 202, disposed on one side of a glass design approach is equally applicable to other LCOS modes of operations, such as TN. It is expected that the overall compensated TN device contrast will be substantially lower than the VAN-mode case, principally because the larger in-plane retardance component (~20 nm for TN vs. <5 nm for VAN-mode) entails a lower reflection contrast and a different Off-state LC director distribution (with lower PCP/AP ratio than VAN-mode) gives a higher azimuthal dependence of the crossed-polarization leakage cone.

Figure 23:
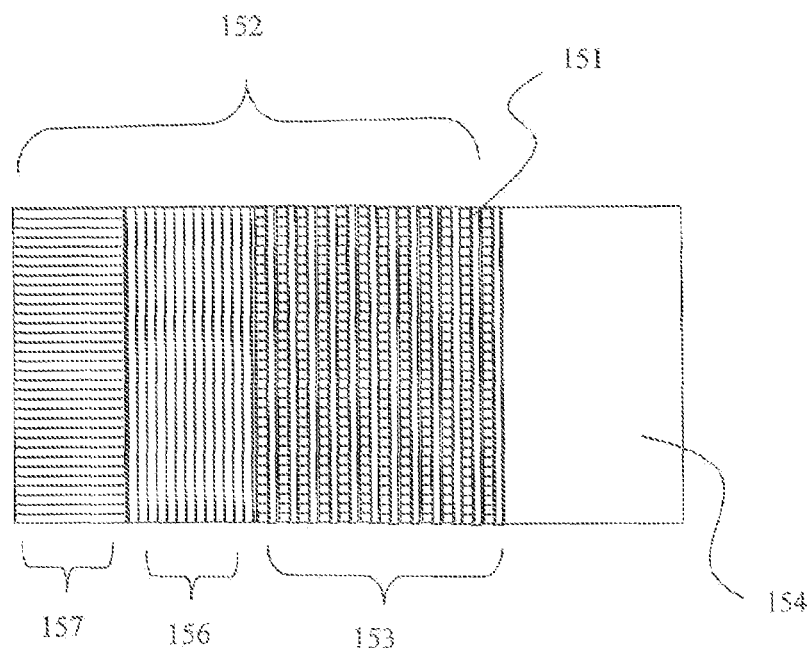
FIG. 23 is a schematic representation of an FBAR stack with the form birefringence stack integrated into the AR coating.

With reference to FIG. 23, rather than depositing conventional antireflection (AR) coatings at the air/FB interface and the substrate/FB interface, an embodiment of the present invention incorporates the form birefringent stack 151 into the AR coating, generally indicated at 152, as a first quarter wave structure 153 adjacent to a substrate 154. The form birefringent stack 151 has an effective refractive index higher than the substrate 154. A half wave structure 156 with a high refractive index, i.e. greater than the effective refractive index, is deposited on the first quarter wave structure 153, and a second quarter wave structure 157 with a low refractive index, i.e. less than the effective refractive index and the refractive index of the substrate, is deposited on the half wave structure 156 to complete a QHQ AR coating 152.

Unfortunately, the form birefringent stack 151 has a phase thickness about twenty to fifty times larger than a single quarter wave layer, which can also vary by about 5 to 10 quarter waves over the range of wavelengths, resulting in a narrowing of the wavelength range in which the AR coating is effective. Accordingly, additional layers in the first quarter wave, the half wave and/or the second quarter wave structures 153, 156, and 157, respectively, are required to match the rapidly changing phase of the form birefringent stack 151. The second quarter wave structure 157 can be replaced with a symmetric three layer combination, e.g. herpin equivalent, with alternating high and low index material resulting in an equivalent index, but potentially three times the phase thickness. The half wave structure 156 can be replaced with one or more full wave or multiple half wave structures. Additional layers may also be required in the first quarter wave structure 153 to add onto one or both sides of the form birefringent stack to achieve the desired indices and phase thickness.

Figure 24:
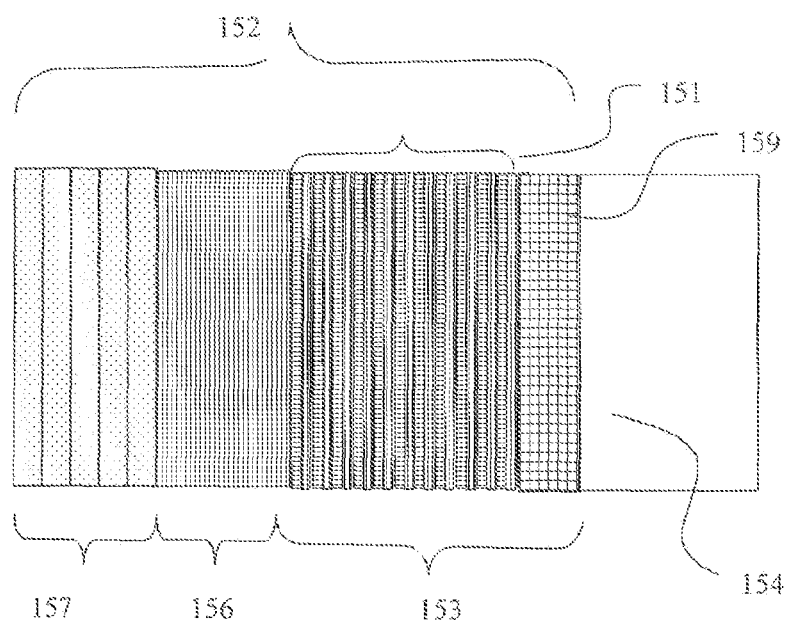
FIG. 24 is a schematic representation of another embodiment of an FBAR stack with the form birefringence stack integrated into the AR coating.
Figure 29:
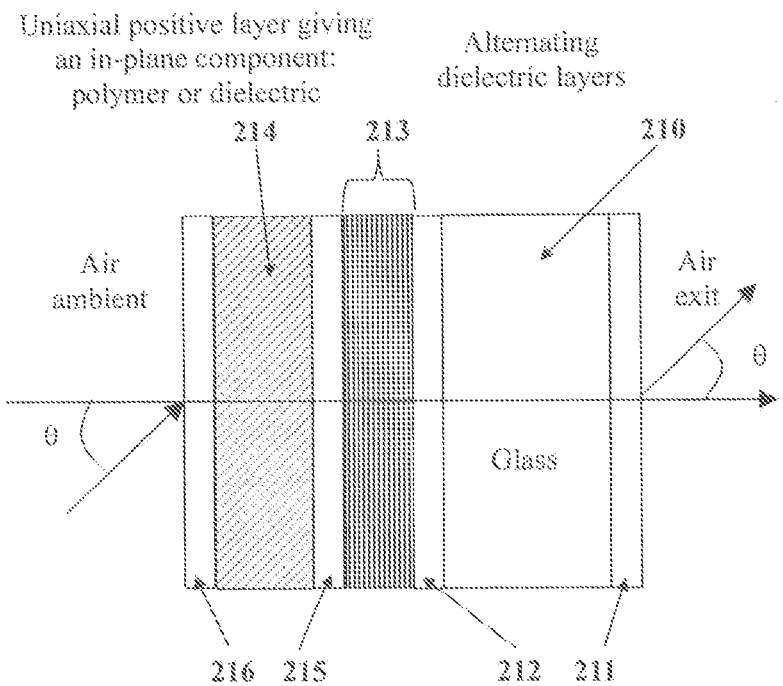
FIG. 29 is a side view of an alternative embodiment of the present invention including and FBAR stack and an a-plate on the same side of a substrate.

If the form birefringent stack has 106 layers of high index material ($n_H$=2 . . . 16 or higher) 10 nm wide alternating with 106 layers of low index material ($n_L$=1.48), i.e. (5 nm H–10 nm L–5 nm H)$^{106}$, the equivalent index of refraction would be $n_E$=1.846. For a typical glass substrate $n_S$=1.52 and an ambient air atmosphere, the initial first quarter wave structure could have an index $n_{QI}$=1.50 and a thickness of approximately 92 nm, and the initial half wave structure could have an index $n_{HW}$=2.3 and a thickness of approximately 120 nm. However, to compensate for the rapidly changing phase of the form birefringent stack the half wave structure comprises one half wave and the second quarter wave structure comprises five quarterwave equivalent structures. FIG. 24 indicates that the second QW structure 157, has now been split into five quarter wave structures. The five quarter wave substrate 200. Alternatively the form birefringent stack could be incorporated into the AR coating, as in FIGS. 23 and 24. On the opposite side of the glass substrate 200, a similar stack of layers 204 is constructed to provide for IPR. Alternatively, the macroscopically birefringent element 204 may be composed of an LCP/LPP layer sequence. The LCP layer or layers can be aligned with their LC directors planar or oblique with respect to the substrate (i.e., a-plate or o-plate uniaxial configuration), as long as the resultant structure has an in-plane retardation component. Ideally, the IPR element 204 is bounded by AR stacks 205 and 206 for reducing reflections. For trim retarder applications, in which polymers are not ideal, e.g. in high light flux displays systems, the IPR element may be constructed out of all dielectric materials. In this case, the FBAR structure may be coated on the opposite side of the substrate or as an additional multiple-layer dielectric coating coated onto the dielectric a-or o-plate retardation element. With reference to FIG. 29, a form birefringence element 213 and an IPR element 214, which may be a positive uniaxial polymeric medium aligned with an in-plane birefringence, i.e. either o-plate or a-plate configuration, are coated on a single side of a substrate 210. The arrangement of elements 213 and 214 may be reversed to make the fabrication process easier. Preferably, the birefringence elements 213 and 214 may also be bounded by AR layers 211, 212, 215 and 216 to reduce interface reflections. The FBAR stack 213, incorporated into a full-function AP/NCP trim retarder, is used to offset any positive c-plate (PCP) retardation component from the trim retarder itself, as well as the OPR of imager panel.

Figure 30:
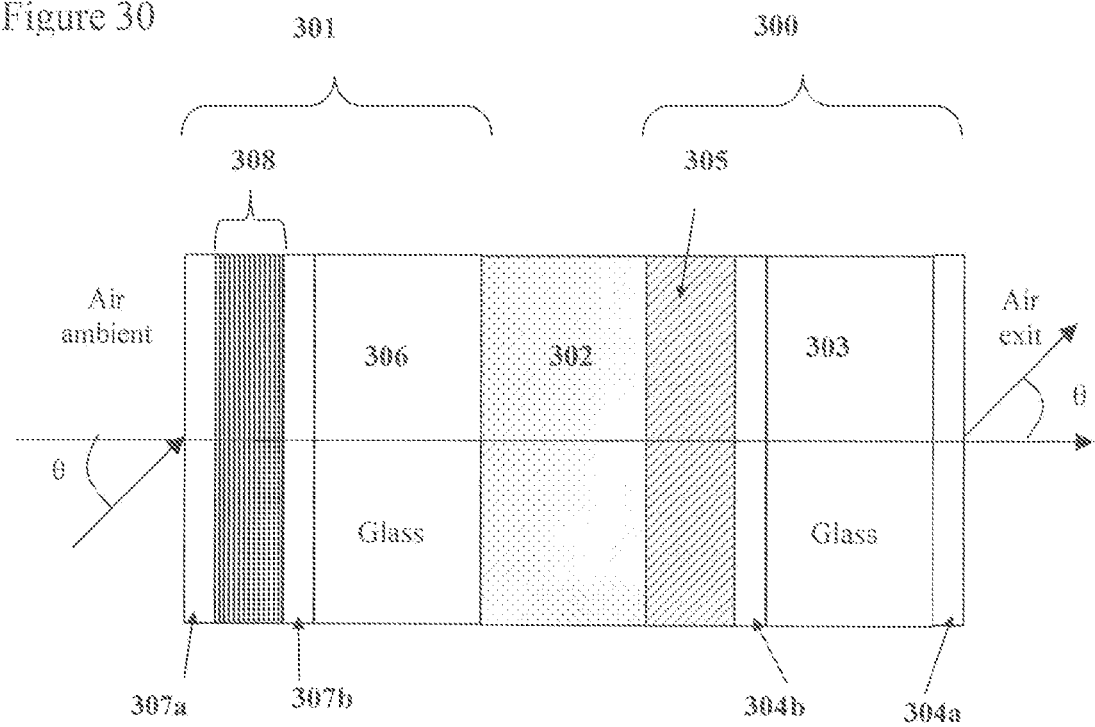
FIG. 30 is a side view of an alternative embodiment of the present invention including and FBAR stack and an a-plate on separate substrates laminated together.

Other embodiments of AP/NCP trim retarders, incorporating a plurality of FBAR stacks and a plurality of IPR elements, are illustrated in FIGS. 30 to 33. These embodiments are particularly useful when more than one FBAR stack and more than one IPR element are needed, but the two retarder elements cannot be sequentially coated on one another. In FIG. 30, an IPR element 300, such as an LCP on LPP structure, and an FBAR stack 301 are assembled together by way of an epoxy layer 302. The IPR element 300 is an integrated sub-assembly consisting of a glass substrate 303, AR coating layers 304a and 304b, and a birefringent medium 305. The FBAR sub-assembly 301 includes a glass substrate 306, AR coating layers 307a and 307b, and a series of alternating index #1 and index #2 dielectric layers 308. Alternatively the form birefringent stack could be incorporated into AR coating, as in FIGS. 23 and 24. The advantage of the laminated trim retarder structure is the ability to mix and match FBAR-coated cover-glass sub-assemblies. For example, the IPR element 300 may be a common design for the entire visible wavelength band and depending on the selected color-band of use in a projection light engine, but the FBAR sub-assembly 301 may be targeted for Red, Blue or Green designs. Due to the high dispersion of the FBAR c-plate retardation over the visible wavelength range, interchangeable FBAR sub-assemblies makes the design and assembly processes easier.

Figure 31:
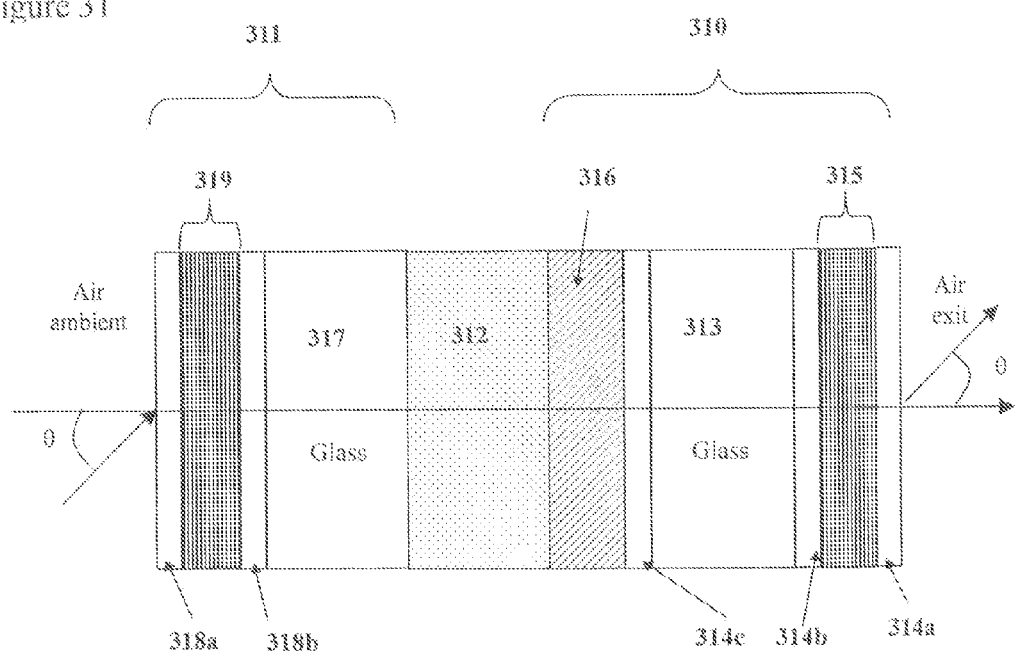
FIG. 31 is a side view of an alternative embodiment of the present invention including two FBAR stacks and an a-plate on separate substrates laminated together.
Figure 32:
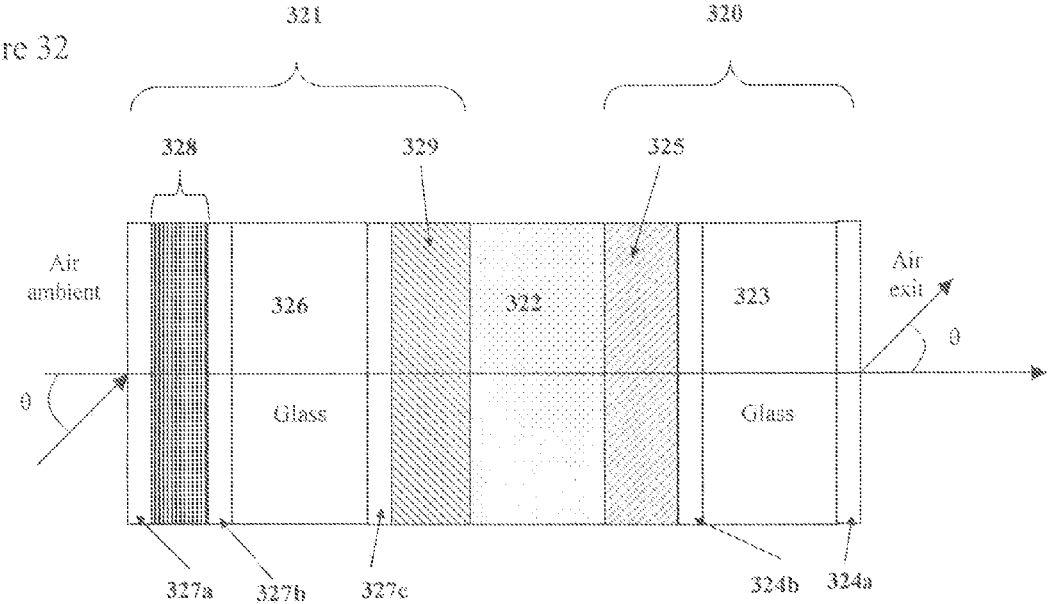
FIG. 32 is a side view of an alternative embodiment of the present invention including one FBAR stack and two a-plates on separate substrates laminated together.

Other variations of the non-integral AP/NCP trim retarder structure involve the lamination of IPR/FBAR sub-assembly 310 with an FBAR-coated cover glass 311 with an adhesive layer 312 therebetween, as in FIG. 31. The IPR/FBAR sub-assembly 310, similar to that of FIG. 28, includes a glass substrate 313 with a stack of alternating dielectric layers 315 on one side and an IPR element 316 on an opposite side. AR coatings 314a, 314b and 314c are applied at the material interfaces. The FBAR sub-assembly 311, similar to FIG. 5, includes a glass substrate 317 with a stack of alternating dielectric layers 319 coated thereon. As usual AR coating 318a and 318b are applied at the material interfaces. Alternatively the form birefringent stack could be incorporated into AR coating, as in FIGS. 23 and 24. With reference to FIG. 32, an IPR sub-assembly 320 and an IPR/FBAR sub-assembly 321 are laminated together with a suitable adhesive layer 322. The IPR sub-assembly 320 includes a glass substrate 323 coated with AR coatings 324a and 324b, and with an IPR element 325 disposed thereon. As above, the IPR/FBAR sub-assembly 321 includes a glass substrate 326 with a stack of alternating dielectric layers 328 on one side and an IPR element 329 on an opposite side. AR coatings 327a, 327b and 327c are applied at the material interfaces. Alternatively the form birefringent stack could be incorporated into AR coating, as in FIGS. 23 and 24. A symmetric pair of IPR/FBAR sub-assemblies 330 and 331, are illustrated in FIG. 33. The first IPR/FBAR sub-assembly 330 includes a glass substrate 333 with a stack of alternating dielectric layers 335 on one side and an IPR element 336 on an opposite side. AR coatings 334a, 334b and 334c are applied at the material interfaces. Alternatively the form birefringent stack could be incorporated into AR coating, as in FIGS. 23 and 24. The second IPR/FBAR sub-assembly 331 includes a glass substrate 337 with a stack of alternating dielectric layers 335 on one side and an IPR element 338 on an opposite side. AR coatings 339a, 339b and 339c are applied at the material interfaces. Alternatively the form birefringent stack could be incorporated into AR coating, as in FIGS. 23 and 24. All the sub-assembly structures referred to above have the basic structure of a series of dielectric or polymeric layers coated on one or both sides of a glass substrate, and preferably include AR-function layers.

It is important that a trim retarder solution for a VAN-mode and a TN-mode LCOS imager incorporates both an IPR and an NCP retardation component. If the IPR element is implemented with LCP/LPP layered structures, there is an opportunity to realize NCP functionality by crossing the slow-axis of two or more a-plate elements, or two or more o-plate elements. By crossing the principal axes, the difference between the element in-plane retardation components manifests as the net in-plane retardation; the common value of the in-plane retardation components becomes the negative c-plate component; and all positive out-of-plane retardation components sum up as the net positive c-plate retardation.

With reference to FIG. 34, a polymeric retarder 204 includes three layers of LPP material 2042, 2043 and 2044, each aligned with a thin layer of LPP material 2041. The LPP layers 2042 to 2044 may be homogenous in tilt profile, e.g. a-plates, or they may be splayed o-plates. Layers 2042 and 2043 may be constructed in a mirrored tilt fashion so as to mimic the pi-cell effect in a single-pass, thereby having an effective in-plane retarder axis lying in the plane of drawing (projection of LC director along the vertical direction). If the tilt profiles of the layers 2042 and 2043 are similar or symmetric, the net in-plane retardation component is proportional to the sum of thickness $(d_a+d_b)$. The third LCP layer 2044 is disposed on the LCP/LPP stack, i.e. layers 2042 and 2043, but with the effective in-plane retarder axis lying normal to the plane of drawing (projection of LC director along the horizontal direction). Accordingly, if the tilt-profile has the same effective value, the net a-plate component is given by $|d_a+d_b-d_c|*\Delta n$ (effective in-plane). The NCP value is the smaller of $(d_a+d_b)$ and $d_c$, multiplied by $\Delta n$ (effective in-plane); the positive c-plate component is given by $(d_a+d_b+d_c)* \Delta n$ (effective out-of-plane). Therefore, a multi-layer O-plate structure is inadequate to create a net NCP effect. Two or more layers of a-plate elements would have to be used to create a trim retarder that has the AP/NCP functionality requirement. Rather than using the multiple-layer o-plate structure 204, an FBAR stack, as shown in FIG. 28, can be used to offset the resultant positive c-plate components.

Figure 35:
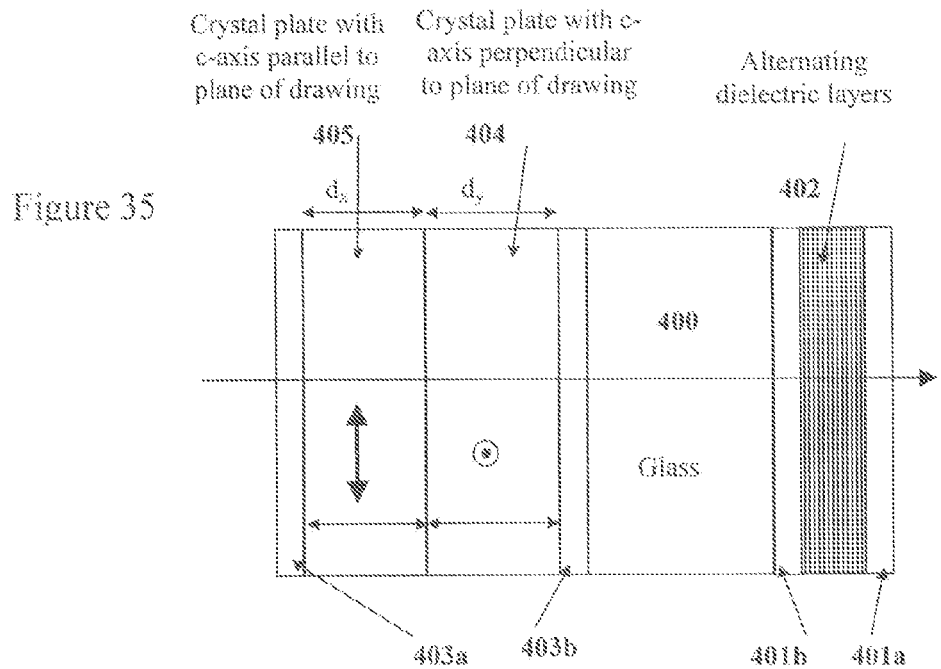
FIG. 35 is a side view of an alternative embodiment of the present invention including an FBAR stack and two crystal plates with crossed c-axes.

While the NCP given by the FBAR stack is radially symmetric, the same cannot be said about the crossed-axes a-plates or o-plate elements. Due to the presence of two in-plane retarder axes, the off-axis effects along and away from these axes are quite different. In general, it can be shown that an AP/NCP trim retarder incorporating crossed-axes a-plate elements delivers approximately half the compensation efficiency as compared to the an AP/NCP trim retarder incorporating radially-symmetric NCP, such as crystal-based negative uniaxial c-plate, FBAR stacks or bidirectionally-stretched polymeric films. Because of this lack of efficiency, pseudo-zero order crystal plates, providing a non-polymeric IPR element, may be better suited for integration with an FBAR stack. With reference to FIG. 35, the difference between the widths of the two crystal plate elements 404 and 405 provides for the a-plate component. For trim retarder applications, a low pseudo-zero order is more desirable for crystal plate processing than a true zero order crystal waveplate. For example, to realize a 20 nm in-plane retardance at $\lambda=550$ nm, a single-crystal quartz would have to be ~2 μm thick, however, the required in-plane retardance can also be obtained by crossing the axes of a 10 μm plate and a 12 μm plate, which thereby provides a –90 nm NCP component. In order to obtain a few hundred nm of NCP within the visible wavelength spectrum, an FBAR stack 402 can be added to glass substrate 400 opposite the thin crystal plates 404 and 405. For transmission at normal incidence, the FBAR stack 402 serves as a high efficiency AR coating and at off-axis transmission, the FBAR stack 402 introduces relative delays between the two eigen modes of propagation. Traditional AR coating 401a, 401b, 403a and 403b are provided at the material interfaces. Alternatively the form birefringent stack could be incorporated into AR coating, as in FIGS. 23 and 24.

Figures 1A, 1B:
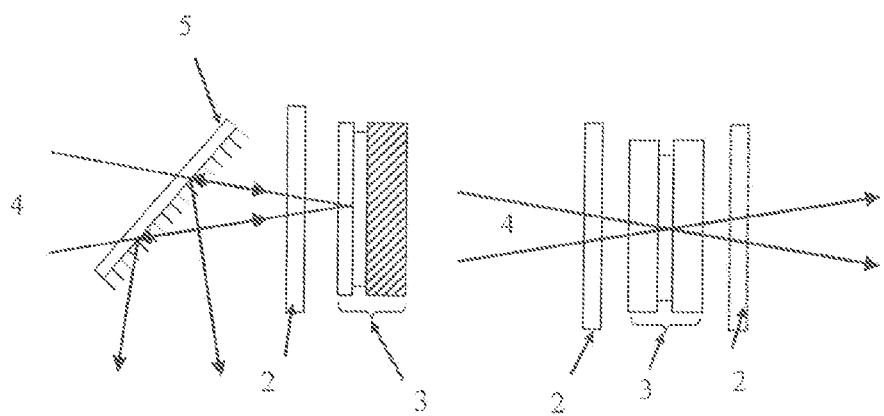
FIG. 1a is a side view of a conventional LCoS display panel assembly.
FIG. 1b is a side view of a conventional transmissive LC display panel assembly.
Figure 2:
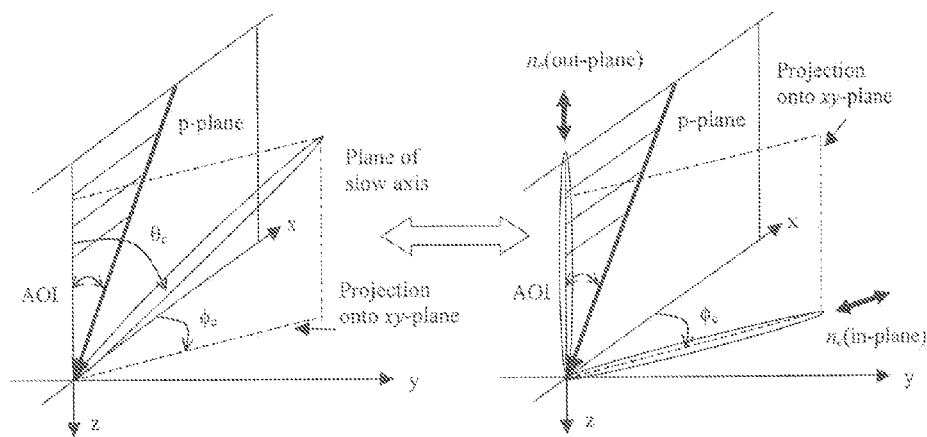
FIG. 2 is a conventional VAN-mode LC decomposed into in-plane and out-of-plane retardation components.
Figure 36:
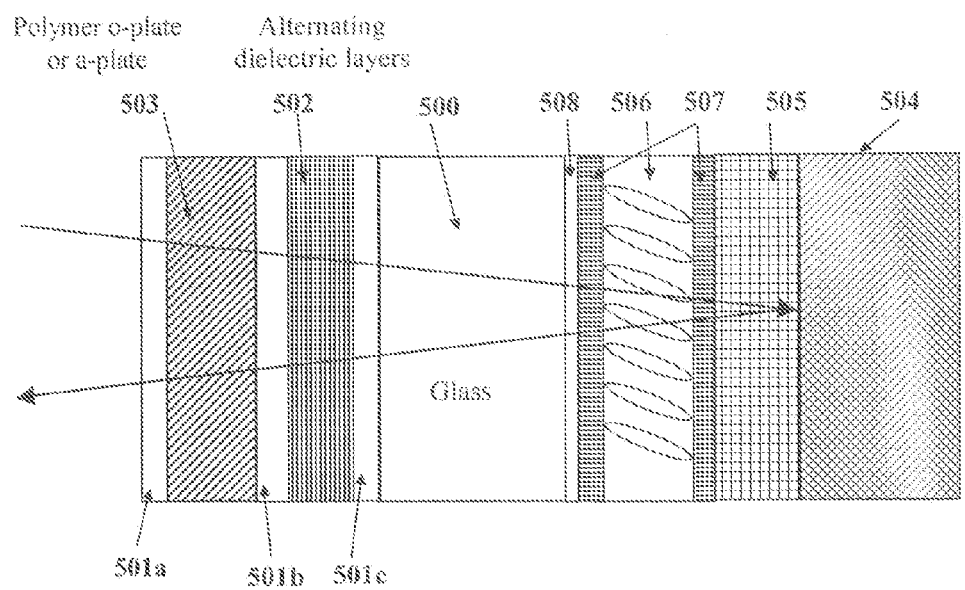
FIG. 36 is a side view of an alternative embodiment of the present invention including and FBAR stack integrated with the LC display panel.

In high performance projection system displays, the contrast requirement could be several thousands to 1. Reflected rays from birefringent elements acquire a fraction of the net retardation due to imperfect external AR coatings. Imperfect AR coatings have detrimental effects by converting the incoming linear polarization into an orthogonal linear polarization component, which gets imaged onto the screen through a pair of crossed polarizer-analyzer settings, along with the main beam. In simple compensated micro-displays, illustrated in FIGS. 1a and 1b, there are at least two redundant AR-coated surfaces of the trim retarder and the display panel, each facing the other, that can be removed by making the trim retarder assembly part of the LCOS or xLCD backing/cover glass plates. An integrated trim retarder and LCOS display panel cover glass are illustrated in FIG. 36. A complete AP/NCP trim retarder sub-assembly, similar to that of FIG. 29, includes a FBAR stack 502 and a polymeric or dielectric IPR element 503 disposed on one side of the glass substrate 500 with suitable AR-coating layers 501a, 501b and 501c therebetween. Alternatively the form birefringent stack could be incorporated into AR coating, as in FIGS. 23 and 24. The glass substrate 500 forms an LC cell gap 506 with a top-level metal reflector 505, which is disposed on top of a silicon backplane (substrate) 504. The LC cell assembly is completed with alignment layers 507, e.g. polymeric or obliquely evaporated inorganic layers, and front transparent conductive electrode 508, e.g. indium tin oxide (ITO).

We claim:

1. A polarization controlling device for providing a desired amount of phase delay to compensate for a predetermined amount of out of plane retardance between 0 nm and 1000 nm, single pass, in a liquid crystal (LC) display panel, which has out of plane ordinary and extraordinary indices of refraction, comprising:

a substrate having a refractive index;

a form birefringent multi-layer dielectric (FB) stack disposed on the substrate including a first plurality of layers having a first refractive index and a first optical thickness; and a second plurality of layers having a second refractive index and a second optical thickness, interleaved with the first plurality of layers, defining effective out of plane ordinary and extraordinary indices of refraction; and first and second anti-reflection (AR) coatings at interfaces between ambient atmosphere and the device for decreasing the amount of reflection therefrom;

wherein the first and second optical thicknesses are between 1/120 and 1/16 of the center wavelength resulting in a one-dimensional grating structure forming a −C plate for compensating out of plane retardances from the LC panel and from the AR coatings; and wherein a difference between the first and second indices of refraction is greater than 0.5 for increasing the effective indices of refraction and decreasing the width of the FB stack required.

2. The device according to claim 1, wherein the effective indices of refraction of the FB stack are greater than corresponding indices of refraction of the LC panel, whereby the retardance of the FB stack is greater than that of the LC panel to provide the desired phase delay.

3. The device according to claim 1, wherein a first physical thickness of each of the first plurality of layers is substantially the same as a second physical thickness of each of the second plurality of layers for maximizing retardance.

4. The device according to claim 1, wherein the form birefringent stack forms a first quarter wave structure wherein the first quarter wave structure has an effective index of refraction and a rapidly changing phase over a wavelength range;

wherein the first AR coating comprises:
  a first half wave structure adjacent the first quarter wave structure having an index of refraction higher than the effective index of refraction, the first half wave structure including multiple layers of alternating high and low refractive index materials for at least partially compensating for the rapidly changing phase of the first quarter wave structure, the first half wave structure contributing out of plane retardance; and
  a second quarter wave structure adjacent the first half wave structure having an index of refraction lower that the effective index of refraction, the second quarter wave structure including multiple layers of alternating high and low refractive index materials for at least partially compensating for the rapidly changing phase of the first quarter wave structure, the second quarter wave structure contributing out of plane retardance;

wherein the first quarter wave structure, the half wave structure and the second quarter wave structure form an integrated anti-reflection coating; and wherein the amount of out-of-plane retardance from the first quarter wave structure, the first half wave structure, and the second quarter wave structure combine to provide the desired amount of phase delay.

5. The device according to claim 1, further comprising a liquid crystal on silicon display panel creating both in plane and out-of-plane retardance in light passing therethrough including off-axis effects of a metallic reflector; wherein the wavelength range is between 380 nm and 780 nm; wherein the FB stack compensates for the out of plane retardances from the LC panel, the AR coatings and the metal reflector.

6. The device according to claim 1, wherein the form birefringent stack comprises between 10 and 500 first layers, and between 10 and 500 second layers.

7. The device according to claim 1, further comprising a second birefringent multi-layer dielectric stack mounted on an opposite side of said substrate.

8. The device according to claim 1, further comprising a first birefringent material mounted on an opposite side of said substrate or on said second quarter wave structure having an in-plane retardance of between 0.1 nm and 50 nm in the wavelength range.

9. The device according to claim 8, further comprising a second substrate for supporting the first birefringent material, and an adhesive for laminating the first birefringent material to the first substrate.

10. The device according to claim 9, further comprising a second form birefringent multi-layer dielectric stack deposited on the second substrate forming a −C plate with between 0 nm and −1000 nm of retardance in the wavelength range.

11. The device according to claim 8, further comprising a second birefringent material having an in-plane retardance of between 0.1 nm and 50 nm in the wavelength range deposited on a second substrate, wherein the second birefringent material or the second substrate is mounted on the first substrate, the first birefringent material or the first form birefringent stack by an adhesive.

12. The device according to claim 11, further comprising a second form birefringent multi-layer dielectric stack deposited on the second substrate forming a −C plate with between 0 nm and −1000 nm of retardance in the wavelength range.

13. The device according to claim 8, wherein the first birefringent material comprises a plurality of birefringent layers including at least one layer of photo-cured liquid crystal polymer (LCP) and at least one layer of ultra-violet-oriented linearly photo-polymerizable polymer (LPP) for aligning the at least one LCP layer.

14. The device according to claim 13, wherein an effective in-plane retarder axis of one of the LCP layers is perpendicular to effective in-plane retarder axes of other LCP layers, thereby forming a −C plate with between 0 nm and −1000 nm of out-of-plane retardance in the wavelength range.

15. The device according to claim 8, wherein the first birefringent material comprises one or more birefringent crystals.

16. The device according to claim 15, wherein the first birefringent material comprises first and second birefringent crystals with perpendicular in-plane fast axes, thereby providing an effective in-plane dispersion defined by a difference between in-plane dispersions of the first and second birefringent crystals, and thereby providing between 0 nm and −1000 nm of out-of-plane retardance in the wavelength range.

17. A liquid crystal on silicon display panel assembly comprising:
  a liquid crystal on silicon display panel creating both in plane and out-of-plane residual birefringence in light passing therethrough;
  an A plate having an in-plane retardance of between 0.1 nm and 50 nm in a wavelength range between 380 nm to 780 nm, which defines a center wavelength, for compensating for the in-plane residual birefringence of the liquid crystal display panel;
  a substrate for supporting the A plate; and
  a −C plate supported by the substrate having an out-of-plane retardance of between 0 nm and −1000 nm in a wavelength range between 380 nm and 780 nm for compensating for the out-of-plane residual birefringence of the liquid crystal display panel, out-of-plane retardance caused by an off-axis reflection from an air/substrate interface, and out-of-plane retardance cause by itself and the A plate.
  wherein the −C plate comprises a first form birefringent multi-layer dielectric stack including a first plurality of layers having a first refractive index and a first optical thickness; and a second plurality of layers having a second refractive index and a second optical thickness, interleaved with the first plurality of layers;

wherein the first and second optical thicknesses are less than the center wavelength resulting in a one-dimensional grating structure.

18. The assembly according to claim 17, wherein the effective indices of refraction of the FB stack are greater than corresponding indices of refraction of the LC panel, whereby the retardance of the FB stack is greater than that of the LC panel to provide the desired phase delay.

19. The assembly according to claim 17, wherein the form birefringent stack forms a first quarter wave structure wherein the first quarter wave structure has an effective index of refraction and a rapidly changing phase over a wavelength range;

the assembly further comprising:
 a first half wave structure adjacent the first quarter wave structure having an index of refraction higher than the effective index of refraction, the first half wave structure including multiple layers of alternating high and low refractive index materials for at least partially compensating for the rapidly changing phase of the first quarter wave structure, the first half wave structure contributing out of plane retardance; and
 a second quarter wave structure adjacent the first half wave structure having an index of refraction lower that the effective index of refraction, the second quarter wave structure including multiple layers of alternating high and low refractive index materials for at least partially compensating for the rapidly changing phase of the first quarter wave structure, the second quarter wave structure contributing out of plane retardance;

wherein the first quarter wave structure, the half wave structure and the second quarter wave structure form an integrated anti-reflection coating; and wherein the amount of out-of-plane retardance from the first quarter wave structure, the first half wave structure, and the second quarter wave structure combine to provide the desired amount of phase delay.

20. The assembly according to claim 17, wherein the A-plate comprises a plurality of birefringent layers including a plurality of photo-cured liquid crystal polymer (LCP) layers and at least one layer of ultra-violet-oriented linearly photo-polymerizable polymer (LPP) for aligning the at least one LCP layer; and wherein an effective in-plane retarder axis of one of the LCP layers is perpendicular to effective in-plane retarder axes of other LCP layers providing additional out-of-plane compensation.

* * * * *